(12) United States Patent
Han et al.

(10) Patent No.: US 12,244,525 B2
(45) Date of Patent: *Mar. 4, 2025

(54) INFORMATION TRANSMISSION METHOD AND NETWORK DEVICE

(71) Applicant: Huawei Technologies Co., Ltd., Shenzhen (CN)

(72) Inventors: Xiao Han, Shenzhen (CN); Changfeng Ding, Chengdu (CN); Xuming Fang, Chengdu (CN); Yan Long, Chengdu (CN); Mengyao Ma, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/527,690

(22) Filed: Dec. 4, 2023

(65) Prior Publication Data
US 2024/0106586 A1 Mar. 28, 2024

Related U.S. Application Data

(63) Continuation of application No. 17/873,472, filed on Jul. 26, 2022, now Pat. No. 11,876,738, which is a
(Continued)

(30) Foreign Application Priority Data

Aug. 14, 2017 (CN) .......................... 201710691261.6

(51) Int. Cl.
*H04W 56/00* (2009.01)
*H04B 7/06* (2006.01)
(Continued)

(52) U.S. Cl.
CPC ......... *H04L 5/0035* (2013.01); *H04B 7/0617* (2013.01); *H04W 48/12* (2013.01);
(Continued)

(58) Field of Classification Search
CPC ..... H04L 5/0035; H04W 76/11; H04W 72/20; H04W 72/23; H04W 48/12; H04W 72/0446; H04B 7/0617
(Continued)

(56) References Cited

U.S. PATENT DOCUMENTS 8,072,947 B2   12/2011   Cho et al.
10,623,981 B2   4/2020   Lin et al.
(Continued)

FOREIGN PATENT DOCUMENTS

CN   1829177 A   9/2006
CN   1855867 A   11/2006
(Continued)

OTHER PUBLICATIONS

"Draft Standard for Information Technology Telecommunications and Information Exchange Between Systems Local and Metropolitan Area Networks Specific Requirements Part 11: Wireless LAN Medium Access Control (MAC) and Physical Layer(PHY) Specifications Amendment 7: Enhanced throughput for operation in license-exempt bands above 45 GHz," IEEE P802.11ay/D0.35, May 2017, 256 pages.
(Continued)

*Primary Examiner* — Sai Ming Chan
(74) *Attorney, Agent, or Firm* — Slater Matsil, LLP

(57) ABSTRACT

An information transmission method and a network device, the network device including a transceiver, a processor, and a non-transitory storage medium storing a computer program for execution by the processor. The computer program includes instructions to receive a first frame through the receiver, where an extended schedule element of the first frame has a field indicating communication between network devices is supported, and where the extended schedule element further has a source association identifier and a
(Continued)

destination association identifier, and control the transceiver to transmit information to a first network device when both the first network device and the network device support communication between network devices, where a value of the source association identifier and a value of the destination association identifier are each 0.

20 Claims, 14 Drawing Sheets

Related U.S. Application Data continuation of application No. 16/790,044, filed on Feb. 13, 2020, now Pat. No. 11,424,876, which is a continuation of application No. PCT/CN2018/096321, filed on Jul. 19, 2018.

(51) Int. Cl.
  *H04L 5/00* (2006.01)
  *H04W 48/12* (2009.01)
  *H04W 72/0446* (2023.01)
  *H04W 72/20* (2023.01)
  *H04W 72/23* (2023.01)
  *H04W 76/11* (2018.01)

(52) U.S. Cl.
  CPC ....... *H04W 72/0446* (2013.01); *H04W 72/20* (2023.01); *H04W 72/23* (2023.01); *H04W 76/11* (2018.02)

(58) Field of Classification Search
  USPC ........................................................ 370/329
  See application file for complete search history.

(56) References Cited

U.S. PATENT DOCUMENTS

| | | | |
|---|---|---|---|
| 11,233,732 B2 | 1/2022 | Che et al. | |
| 11,457,333 B2 | 9/2022 | Adachi | |
| 2011/0110340 A1 | 5/2011 | Lakkis | |
| 2013/0176993 A1 | 7/2013 | Trainin et al. | |
| 2015/0098388 A1* | 4/2015 | Fang ..................... | H04W 48/18 370/328 |
| 2015/0282063 A1 | 10/2015 | Patil et al. | |
| 2016/0135115 A1 | 5/2016 | Patil et al. | |
| 2016/0249349 A1 | 8/2016 | Trainin et al. | |
| 2016/0323925 A1* | 11/2016 | Alanen ................. | H04W 8/005 |
| 2017/0094693 A1 | 3/2017 | Law et al. | |
| 2017/0201992 A1 | 7/2017 | Cordeiro et al. | |

FOREIGN PATENT DOCUMENTS

| | | |
|---|---|---|
| CN | 101331439 A | 12/2008 |
| CN | 102256356 A | 11/2011 |
| CN | 104041169 A | 9/2014 |
| CN | 106102127 A | 11/2016 |
| CN | 106134257 A | 11/2016 |
| CN | 106717053 A | 5/2017 |
| CN | 106936713 A | 7/2017 |
| CN | 104770033 B | 3/2019 |
| EP | 2932613 B1 | 7/2016 |
| WO | 2014028730 A1 | 2/2014 |
| WO | 2015038175 A1 | 3/2015 |
| WO | 2017008044 A1 | 1/2017 |
| WO | 2017043911 A1 | 3/2017 |
| WO | 2017043912 A1 | 3/2017 |

OTHER PUBLICATIONS

IEEE Standards Association, "Part 11: Wireless LAN Medium Access Control (MAC) and Physical Layer (PHY) Specifications," IEEE Computer Society, IEEE Std 802.11-2016 (Revision of IEEE Std 802.11-2012), Dec. 7, 2016, 3534 pages.

IEEE Standards Association, "Part 11: Wireless LAN Medium Access Control (MAC) and Physical Layer (PHY) Specifications, Amendment 3: Enhancements for Very High Throughput in the 60 GHz Band," IEEE Computer Society, IEEE Std 802.11ad-2012, Dec. 28, 2012, 628 pages.

Sun, R. et al., "IEEE 802.11 TGay Use Cases," IEEE 802.11-2015/0625r4, Jul. 2017, 30 pages.

\* cited by examiner

| Channel allocation field | Scheduling type | Allocation key | Channel aggregation | Bandwidth | Asymmetric beamforming training | Receive direction | Inter-PCP/AP beamforming training or communication | Reserved |
|---|---|---|---|---|---|---|---|---|
| Bit | 1 | 24 | 1 | 8 | 1 | 9 | 1 | 3 |
| | B0 | B1  B24 | B25 | B26 B33 | B34 | B35  B43 | B44 | B45  B47 |

FIG. 4

| Channel allocation field | Scheduling type | Channel aggregation | Bandwidth | Asymmetric beamforming training | Receive direction | Inter-PCP/AP beamforming training or communication | Reserved | Allocation |
|---|---|---|---|---|---|---|---|---|
| Bit | 1 | 1 | 8 | 1 | 9 | 1 | 3 | 8x15 |
| | B0 | B1 | B2 B9 | B10 | B11 B19 | B20 | B21 B23 | B24 B143 |

FIG. 6

| Cluster control field | B0 | B7 B8 | B55 B56 | B57 B58 | B62 B63 |
|---|---|---|---|---|---|
| | Beacon service period duration | Cluster identifier | Cluster member role | Cluster maximum member | Inter-PCP/AP beamforming training |
| Bit | 8 | 48 | 2 | 5 | 1 |

FIG. 11

| Cluster control field | B0 B47 | B48 B49 | B63 |
|---|---|---|---|
| | Association beamforming training responder address | Inter-PCP/AP beamforming training | Reserved |
| Bit | 48 | 1 | 15 |

FIG. 12

INFORMATION TRANSMISSION METHOD AND NETWORK DEVICE

CROSS-REFERENCE TO RELATED APPLICATIONS

This application is a continuation of U.S. patent application Ser. No. 17/873,472, filed on Jul. 26, 2022, now U.S. Pat. No. 11,876,738 issued on Jan. 16, 2024, which is a continuation of U.S. patent application Ser. No. 16/790,044, filed on Feb. 13, 2020, now U.S. Pat. No. 11,424,876 issued on Aug. 23, 2022, which is a continuation of International Application No. PCT/CN2018/096321, filed on Jul. 19, 2018. The International Application claims priority to Chinese Patent Application No. 201710691261.6, filed on Aug. 14, 2017. All of the afore-mentioned patent applications are hereby incorporated by reference in their entireties.

TECHNICAL FIELD

This application relates to communications technologies, and in particular, to an information transmission method and a network device.

BACKGROUND

Currently, devices in a wireless local area network (WLAN) mostly operate on 2.4 GHz to 5 GHz frequency bands. As more devices use the frequency bands, spectrum resources on the frequency bands become quite dense, while a 60 GHz millimeter-wave frequency band has a large quantity of available spectrum resources. Therefore, the 60 GHz frequency band is widely used in the future.

However, severe signal attenuation and path loss occur on a millimeter-wave channel. Therefore, in millimeter wave communication, receive and transmit beams need to be aligned through beamforming (BF) training, and data is received and sent based on the aligned receive and transmit beams, so that a gain of a receive/transmit antenna can be effectively increased to alleviate signal attenuation. However, according to a current millimeter-wave communications standard, information transmission may be performed only in one basic service set (BSS).

To better utilize resources such as a time domain resource, a frequency domain resource, and a space resource, different network devices need to frequently perform coordinated communication to perform operations such as interference management, resource management and allocation, and mobile handover management for user equipment. Therefore, information transmission between the different network devices is very important.

SUMMARY

This application provides an information transmission method and a network device, to implement information transmission between network devices.

According to a first aspect, an embodiment of this application provides an information transmission method, including listening, by a second network device, to a first frame sent by a first network device, where the first frame may be used to indicate whether the first network device supports communication between network devices, and if both the first network device and the second network device support the communication between the network devices, transmitting, by the second network device, information with the first network device.

In the method, information transmission between different network devices can be implemented, to effectively ensure that the different network devices can perform operations such as interference management, resource management and allocation, and mobile handover management for user equipment through coordinated communication, so as to better use resources such as a time domain resource, a frequency domain resource, and a space resource.

In a possible implementation, that the first frame is used to indicate whether the first network device supports communication between network devices may include the first frame includes a bit used to indicate whether the first network device supports the communication between the network devices.

Alternatively, that the first frame is used to indicate whether the first network device supports communication between network devices includes the first frame is used for implicit indication by using a frame type.

In another possible implementation, that the first frame is used to indicate whether the first network device supports communication between network devices includes the first frame includes first allocation information used to indicate whether the first network device supports the communication between the network devices.

In the method, interference caused by user equipment in a BSS in which a network device is located to the communication between the network devices can be avoided, to ensure the communication between the network devices.

In still another possible implementation, the first allocation information includes a field used to indicate the communication between the network devices, and/or a field used to indicate a source network device identifier and a field used to indicate a target network device identifier.

In yet another possible implementation, the field indicating the communication between the network devices includes at least one of the following locations in the first frame: a reserved bit in an allocation control field in an allocation field in an extended schedule element, an allocation type field in the allocation control field in the allocation field in the extended schedule element, a source association identifier field and a destination association identifier field that are in the allocation field in the extended schedule element, a reserved bit in a channel allocation field in an enhanced directional multi-gigabit (EDMG) extended schedule element, a reserved bit in an allocation key field in the channel allocation field in the EDMG extended schedule element, and a source association identifier field and a destination association identifier field that are in the allocation key field in the channel allocation field in the EDMG extended schedule element.

In yet another possible implementation, the field indicating the source network device identifier and the field indicating the target network device identifier include at least one of the following locations in the first frame: a source association identifier field and a destination association identifier field that are in an allocation field in an extended schedule element, fields in an information element other than the extended schedule element in the first frame, a source association identifier field and a destination association identifier field that are in an allocation key field in a channel allocation field in an EDMG extended schedule element, and fields in an information element other than the EDMG extended schedule element in the first frame.

In yet another possible implementation, the field indicating the communication between the network devices includes an allocation type field in an allocation control field in an allocation field in an extended schedule element in the first frame, and the field indicating the source network device identifier and the field indicating the target network device identifier are a source association identifier field and a destination association identifier field that are in the allocation field in the extended schedule element in the first frame.

Alternatively, the field indicating the communication between the network devices includes an allocation type field in an allocation control field in an allocation field in an extended schedule element in the first frame, and a source association identifier field and a destination association identifier field that are in the allocation field, and the field indicating the source network device identifier and the field indicating the target network device identifier are fields in an information element other than the extended schedule element in the first frame.

Alternatively, the field indicating the communication between the network devices includes an allocation type field in an allocation control field in an allocation field in an extended schedule element in the first frame, and the field indicating the source network device identifier and the field indicating the target network device identifier are fields in an information element other than the extended schedule element in the first frame.

Alternatively, the field indicating the communication between the network devices includes a source association identifier field and a destination association identifier field that are in an allocation field in an extended schedule element in the first frame, and the field indicating the source network device identifier and the field indicating the target network device identifier are fields in an information element other than the extended schedule element in the first frame.

Alternatively, the field indicating the source network device identifier and the field indicating the target network device identifier are a source association identifier field and a destination association identifier field that are in an allocation field in an extended schedule element in the first frame.

In yet another possible implementation, the first frame further includes a field used to indicate a start time point and a field used to indicate duration.

In yet another possible implementation, before the transmitting, by the second network device, information with the first network device, the method may further include sending, by the second network device, a second frame to the first network device, where the second frame indicates whether the second network device supports the communication between the network devices.

In yet another possible implementation, that the second frame is used to indicate whether the second network device supports the communication between the network devices includes the second frame includes a bit used to indicate whether the second network device supports the communication between the network devices.

Alternatively, that the second frame is used to indicate whether the second network device supports the communication between the network devices includes the second frame is used for implicit indication by using a frame type.

In yet another possible implementation, that the second frame is used to indicate whether the second network device supports the communication between the network devices includes the second frame includes second allocation information used to indicate whether the second network device supports the communication between the network devices.

In yet another possible implementation, the second allocation information includes a field used to indicate the communication between the network devices, and/or a field used to indicate a source network device identifier and a field used to indicate a target network device identifier.

In yet another possible implementation, the field indicating the communication between the network devices includes at least one of the following locations in the second frame: a reserved bit in an allocation control field in an allocation field in an extended schedule element, an allocation type field in the allocation control field in the allocation field in the extended schedule element, a source association identifier field and a destination association identifier field that are in the allocation field in the extended schedule element, a reserved bit in a channel allocation field in an enhanced directional multi-gigabit (EDMG) extended schedule element, a reserved bit in an allocation key field in the channel allocation field in the EDMG extended schedule element, and a source association identifier field and a destination association identifier field that are in the allocation key field in the channel allocation field in the EDMG extended schedule element.

In yet another possible implementation, the field indicating the source network device identifier and the field indicating the target network device identifier include at least one of the following locations in the second frame: a source association identifier field and a destination association identifier field that are in an allocation field in an extended schedule element, fields in an information element other than the extended schedule element in the second frame, a source association identifier field and a destination association identifier field that are in an allocation key field in a channel allocation field in an EDMG extended schedule element, and fields in an information element other than the EDMG extended schedule element in the second frame.

In yet another possible implementation, the field indicating the communication between the network devices includes an allocation type field in an allocation control field in an allocation field in an extended schedule element in the second frame, and the field indicating the source network device identifier and the field indicating the target network device identifier are a source association identifier field and a destination association identifier field that are in the allocation field in the extended schedule element in the second frame.

Alternatively, the field indicating the communication between the network devices includes an allocation type field in an allocation control field in an allocation field in an extended schedule element in the second frame, and a source association identifier field and a destination association identifier field that are in the allocation field, and the field indicating the source network device identifier and the field indicating the target network device identifier are fields in an information element other than the extended schedule element in the second frame.

Alternatively, the field indicating the communication between the network devices includes an allocation type field in an allocation control field in an allocation field in an extended schedule element in the second frame, and the field indicating the source network device identifier and the field indicating the target network device identifier are fields in an information element other than the extended schedule element in the second frame.

Alternatively, the field indicating the communication between the network devices includes a source association identifier field and a destination association identifier field that are in an allocation field in an extended schedule element in the second frame, and the field indicating the source network device identifier and the field indicating the target network device identifier are fields in an information element other than the extended schedule element in the second frame.

Alternatively, the field indicating the source network device identifier and the field indicating the target network device identifier are a source association identifier field and a destination association identifier field that are in an allocation field in an extended schedule element in the second frame.

In yet another possible implementation, the second frame further includes a field used to indicate a start time point and a field used to indicate duration.

In yet another possible implementation, the transmitting, by the second network device, information with the first network device may include in an association beamforming training (A-BFT) period, sending, by the second network device, a sweep frame to the first network device, and receiving, by the second network device, a sweep feedback frame sent by the first network device.

Alternatively, the transmitting, by the second network device, information with the first network device may include in an announcement transmission interval (ATI), receiving, by the second network device, a request frame sent by the first network device, and sending, by the second network device, a response frame to the first network device.

Alternatively, the transmitting, by the second network device, information with the first network device may include in a preset time period in a data transfer interval (DTI), sending, by the second network device, a data frame, a control frame, or a management frame to the first network device, and receiving, by the second network device, a data frame, a control frame, or a management frame sent by the first network device.

According to a second aspect, an embodiment of this application further provides an information transmission method, including sending, by a first network device, a first frame, where the first frame is used to indicate whether the first network device supports communication between network devices, and if both the first network device and a second network device support the communication between the network devices, transmitting, by the first network device, information with the second network device.

In a possible implementation, that the first frame is used to indicate whether the first network device supports communication between network devices includes the first frame includes a bit used to indicate whether the first network device supports the communication between the network devices.

Alternatively, that the first frame is used to indicate whether the first network device supports communication between network devices includes the first frame is used for implicit indication by using a frame type.

In another possible implementation, that the first frame is used to indicate whether the first network device supports communication between network devices includes the first frame includes first allocation information used to indicate whether the first network device supports the communication between the network devices.

In still another possible implementation, the first allocation information includes a field used to indicate the communication between the network devices, and/or a field used to indicate a source network device identifier and a field used to indicate a target network device identifier.

In yet another possible implementation, the field indicating the communication between the network devices includes at least one of the following locations in the first frame: a reserved bit in an allocation control field in an allocation field in an extended schedule element, an allocation type field in the allocation control field in the allocation field in the extended schedule element, a source association identifier field and a destination association identifier field that are in the allocation field in the extended schedule element, a reserved bit in a channel allocation field in an enhanced directional multi-gigabit (EDMG) extended schedule element, a reserved bit in an allocation key field in the channel allocation field in the EDMG extended schedule element, and a source association identifier field and a destination association identifier field that are in the allocation key field in the channel allocation field in the EDMG extended schedule element.

In yet another possible implementation, the field indicating the source network device identifier and the field indicating the target network device identifier include at least one of the following locations in the first frame: a source association identifier field and a destination association identifier field that are in an allocation field in an extended schedule element, fields in an information element other than the extended schedule element in the first frame, a source association identifier field and a destination association identifier field that are in an allocation key field in a channel allocation field in an EDMG extended schedule element, and fields in an information element other than the EDMG extended schedule element in the first frame.

In yet another possible implementation, the field indicating the communication between the network devices includes an allocation type field in an allocation control field in an allocation field in an extended schedule element in the first frame, and the field indicating the source network device identifier and the field indicating the target network device identifier are a source association identifier field and a destination association identifier field that are in the allocation field in the extended schedule element in the first frame.

Alternatively, the field indicating the communication between the network devices includes an allocation type field in an allocation control field in an allocation field in an extended schedule element in the first frame, and a source association identifier field and a destination association identifier field that are in the allocation field, and the field indicating the source network device identifier and the field indicating the target network device identifier are fields in an information element other than the extended schedule element in the first frame.

Alternatively, the field indicating the communication between the network devices includes an allocation type field in an allocation control field in an allocation field in an extended schedule element in the first frame, and the field indicating the source network device identifier and the field indicating the target network device identifier are fields in an information element other than the extended schedule element in the first frame.

Alternatively, the field indicating the communication between the network devices includes a source association identifier field and a destination association identifier field that are in an allocation field in an extended schedule element in the first frame, and the field indicating the source network device identifier and the field indicating the target network device identifier are fields in an information element other than the extended schedule element in the first frame.

Alternatively, the field indicating the source network device identifier and the field indicating the target network device identifier are a source association identifier field and a destination association identifier field that are in an allocation field in an extended schedule element in the first frame.

In yet another possible implementation, the first frame further includes a field used to indicate a start time point and a field used to indicate duration.

In yet another possible implementation, before the transmitting, by the first network device, information with the second network device, the method may further include receiving, by the first network device, a second frame sent by the second network device, where the second frame indicates whether the second network device supports the communication between the network devices.

In yet another possible implementation, that the second frame is used to indicate whether the second network device supports the communication between the network devices includes the second frame includes a bit used to indicate whether the second network device supports the communication between the network devices.

Alternatively, that the second frame is used to indicate whether the second network device supports the communication between the network devices includes the second frame is used for implicit indication by using a frame type.

In yet another possible implementation, that the second frame is used to indicate whether the second network device supports the communication between the network devices includes: the second frame includes second allocation information used to indicate whether the second network device supports the communication between the network devices.

In yet another possible implementation, the second allocation information may include a field used to indicate the communication between the network devices, and/or a field used to indicate a source network device identifier and a field used to indicate a target network device identifier.

In yet another possible implementation, the field indicating the communication between the network devices includes at least one of the following locations in the second frame: a reserved bit in an allocation control field in an allocation field in an extended schedule element, an allocation type field in the allocation control field in the allocation field in the extended schedule element, a source association identifier field and a destination association identifier field that are in the allocation field in the extended schedule element, a reserved bit in a channel allocation field in an enhanced directional multi-gigabit (EDMG) extended schedule element, a reserved bit in an allocation key field in the channel allocation field in the EDMG extended schedule element, and a source association identifier field and a destination association identifier field that are in the allocation key field in the channel allocation field in the EDMG extended schedule element.

In yet another possible implementation, the field indicating the source network device identifier and the field indicating the target network device identifier include at least one of the following locations in the second frame: a source association identifier field and a destination association identifier field that are in an allocation field in an extended schedule element, fields in an information element other than the extended schedule element in the second frame, a source association identifier field and a destination association identifier field that are in an allocation key field in a channel allocation field in an EDMG extended schedule element, and fields in an information element other than the EDMG extended schedule element in the second frame.

In yet another possible implementation, the field indicating the communication between the network devices includes an allocation type field in an allocation control field in an allocation field in an extended schedule element in the second frame, and the field indicating the source network device identifier and the field indicating the target network device identifier are a source association identifier field and a destination association identifier field that are in the allocation field in the extended schedule element in the second frame.

Alternatively, the field indicating the communication between the network devices includes an allocation type field in an allocation control field in an allocation field in an extended schedule element in the second frame, and a source association identifier field and a destination association identifier field that are in the allocation field, and the field indicating the source network device identifier and the field indicating the target network device identifier are fields in an information element other than the extended schedule element in the second frame.

Alternatively, the field indicating the communication between the network devices includes an allocation type field in an allocation control field in an allocation field in an extended schedule element in the second frame, and the field indicating the source network device identifier and the field indicating the target network device identifier are fields in an information element other than the extended schedule element in the second frame.

Alternatively, the field indicating the communication between the network devices includes a source association identifier field and a destination association identifier field that are in an allocation field in an extended schedule element in the second frame, and the field indicating the source network device identifier and the field indicating the target network device identifier are fields in an information element other than the extended schedule element in the second frame.

Alternatively, the field indicating the source network device identifier and the field indicating the target network device identifier are a source association identifier field and a destination association identifier field that are in an allocation field in an extended schedule element in the second frame.

In yet another possible implementation, the second frame may further include a field used to indicate a start time point and a field used to indicate duration.

In yet another possible implementation, the transmitting, by the first network device, information with the second network device includes in an association beamforming training (A-BFT) period, receiving, by the first network device, a sweep frame sent by the second network device, and sending, by the first network device, a sweep feedback frame to the second network device.

Alternatively, the transmitting, by the first network device, information with the second network device includes in an announcement transmission slot (ATI), sending, by the first network device, a request frame to the second network device, and receiving, by the first network device, a response frame sent by the second network device.

Alternatively, the transmitting, by the first network device, information with the second network device includes in a preset time period in a data transfer interval (DTI), receiving, by the first network device, a data frame, a control frame, or a management frame sent by the second network device, and sending, by the first network device, a data frame, a control frame, or a management frame to the second network device.

According to a third aspect, an embodiment of this application provides a second network device, including a processing module, configured to control to listen to a first frame sent by a first network device, and if both the first network device and the second network device support communication between network devices, further control to transmit information with the first network device, where the first frame is used to indicate whether the first network device supports the communication between the network devices, and a transceiver module, configured to listen to the first frame sent by the first network device, and transmit the information with the first network device.

In a possible implementation, that the first frame is used to indicate whether the first network device supports the communication between the network devices includes the first frame includes a bit used to indicate whether the first network device supports the communication between the network devices.

Alternatively, that the first frame is used to indicate whether the first network device supports the communication between the network devices includes the first frame is used for implicit indication by using a frame type.

In another possible implementation, that the first frame is used to indicate whether the first network device supports the communication between the network devices includes the first frame includes first allocation information used to indicate whether the first network device supports the communication between the network devices.

In still another possible implementation, the first allocation information includes a field used to indicate the communication between the network devices, and/or a field used to indicate a source network device identifier and a field used to indicate a target network device identifier.

In yet another possible implementation, the field indicating the communication between the network devices includes at least one of the following locations in the first frame: a reserved bit in an allocation control field in an allocation field in an extended schedule element, an allocation type field in the allocation control field in the allocation field in the extended schedule element, a source association identifier field and a destination association identifier field that are in the allocation field in the extended schedule element, a reserved bit in a channel allocation field in an enhanced directional multi-gigabit (EDMG) extended schedule element, a reserved bit in an allocation key field in the channel allocation field in the EDMG extended schedule element, and a source association identifier field and a destination association identifier field that are in the allocation key field in the channel allocation field in the EDMG extended schedule element.

In yet another possible implementation, the field indicating the source network device identifier and the field indicating the target network device identifier include at least one of the following locations in the first frame: a source association identifier field and a destination association identifier field that are in an allocation field in an extended schedule element, fields in an information element other than the extended schedule element in the first frame, a source association identifier field and a destination association identifier field that are in an allocation key field in a channel allocation field in an EDMG extended schedule element, and fields in an information element other than the EDMG extended schedule element in the first frame.

In yet another possible implementation, the field indicating the communication between the network devices includes an allocation type field in an allocation control field in an allocation field in an extended schedule element in the first frame, and the field indicating the source network device identifier and the field indicating the target network device identifier are a source association identifier field and a destination association identifier field that are in the allocation field in the extended schedule element in the first frame.

Alternatively, the field indicating the communication between the network devices includes an allocation type field in an allocation control field in an allocation field in an extended schedule element in the first frame, and a source association identifier field and a destination association identifier field that are in the allocation field, and the field indicating the source network device identifier and the field indicating the target network device identifier are fields in an information element other than the extended schedule element in the first frame.

Alternatively, the field indicating the communication between the network devices includes an allocation type field in an allocation control field in an allocation field in an extended schedule element in the first frame, and the field indicating the source network device identifier and the field indicating the target network device identifier are fields in an information element other than the extended schedule element in the first frame.

Alternatively, the field indicating the communication between the network devices includes a source association identifier field and a destination association identifier field that are in an allocation field in an extended schedule element in the first frame, and the field indicating the source network device identifier and the field indicating the target network device identifier are fields in an information element other than the extended schedule element in the first frame.

Alternatively, the field indicating the source network device identifier and the field indicating the target network device identifier are a source association identifier field and a destination association identifier field that are in an allocation field in an extended schedule element in the first frame.

In yet another possible implementation, the first frame further includes a field used to indicate a start time point and a field used to indicate duration.

In yet another possible implementation, the processing module is further configured to control to send a second frame to the first network device, where the second frame is used to indicate whether the second network device supports the communication between the network devices, and the transceiver module is configured to send the second frame to the first network device.

In yet another possible implementation, that the second frame is used to indicate whether the second network device supports the communication between the network devices includes the second frame includes a bit used to indicate whether the second network device supports the communication between the network devices.

Alternatively, that the second frame is used to indicate whether the second network device supports the communication between the network devices includes the second frame is used for implicit indication by using a frame type.

In yet another possible implementation, that the second frame is used to indicate whether the first network device supports the communication between the network devices includes the second frame includes second allocation information used to indicate whether the second network device supports the communication between the network devices.

In yet another possible implementation, the second allocation information includes a field used to indicate the communication between the network devices, and/or a field used to indicate a source network device identifier and a field used to indicate a target network device identifier.

In yet another possible implementation, the field indicating the communication between the network devices includes at least one of the following locations in the second frame: a reserved bit in an allocation control field in an allocation field in an extended schedule element, an allocation type field in the allocation control field in the allocation field in the extended schedule element, a source association identifier field and a destination association identifier field that are in the allocation field in the extended schedule element, a reserved bit in a channel allocation field in an enhanced directional multi-gigabit (EDMG) extended schedule element, a reserved bit in an allocation key field in the channel allocation field in the EDMG extended schedule element, and a source association identifier field and a destination association identifier field that are in the allocation key field in the channel allocation field in the EDMG extended schedule element.

In yet another possible implementation, the field indicating the source network device identifier and the field indicating the target network device identifier include at least one of the following locations in the second frame: a source association identifier field and a destination association identifier field that are in an allocation field in an extended schedule element, fields in an information element other than the extended schedule element in the second frame, a source association identifier field and a destination association identifier field that are in an allocation key field in a channel allocation field in an EDMG extended schedule element, and fields in an information element other than the EDMG extended schedule element in the second frame.

In yet another possible implementation, the field indicating the communication between the network devices includes an allocation type field in an allocation control field in an allocation field in an extended schedule element in the second frame, and the field indicating the source network device identifier and the field indicating the target network device identifier are a source association identifier field and a destination association identifier field that are in the allocation field in the extended schedule element in the second frame.

Alternatively, the field indicating the communication between the network devices includes an allocation type field in an allocation control field in an allocation field in an extended schedule element in the second frame, and a source association identifier field and a destination association identifier field that are in the allocation field, and the field indicating the source network device identifier and the field indicating the target network device identifier are fields in an information element other than the extended schedule element in the second frame.

Alternatively, the field indicating the communication between the network devices includes an allocation type field in an allocation control field in an allocation field in an extended schedule element in the second frame, and the field indicating the source network device identifier and the field indicating the target network device identifier are fields in an information element other than the extended schedule element in the second frame.

Alternatively, the field indicating the communication between the network devices includes a source association identifier field and a destination association identifier field that are in an allocation field in an extended schedule element in the second frame, and the field indicating the source network device identifier and the field indicating the target network device identifier are fields in an information element other than the extended schedule element in the second frame.

Alternatively, the field indicating the source network device identifier and the field indicating the target network device identifier are a source association identifier field and a destination association identifier field that are in an allocation field in an extended schedule element in the second frame.

In yet another possible implementation, the processing module is configured to in an association beamforming training (A-BFT) period, control to send a sweep frame to the first network device, and control to receive a sweep feedback frame sent by the first network device, and the transceiver module is configured to send the sweep frame to the first network device, and receive the sweep feedback frame sent by the first network device.

Alternatively, the processing module is configured to in an announcement transmission slot ATI, control to receive a request frame sent by the first network device, and control to send a response frame to the first network device, and the transceiver module is configured to receive the request frame sent by the first network device, and send the response frame to the first network device.

Alternatively, the processing module is configured to in a preset time period in a data transfer interval DTI, control to send a data frame, a control frame, or a management frame to the first network device, and control to receive a data frame, a control frame, or a management frame sent by the first network device, and the transceiver module is configured to send the data frame, the control frame, or the management frame to the first network device, and receive the data frame, the control frame, or the management frame sent by the first network device.

According to a fourth aspect, an embodiment of this application may further provide a first network device, including a processing module, configured to control to send a first frame, and if both the first network device and a second network device support communication between network devices, further control to transmit information with the second network device, where the first frame is used to indicate whether the first network device supports the communication between the network devices, and a transceiver module, configured to send the first frame, and transmit the information with the second network device.

In a possible implementation, that the first frame is used to indicate whether the first network device supports the communication between the network devices includes the first frame includes a bit used to indicate whether the first network device supports the communication between the network devices.

Alternatively, that the first frame is used to indicate whether the first network device supports the communication between the network devices includes the first frame is used for implicit indication by using a frame type.

In another possible implementation, that the first frame is used to indicate whether the first network device supports the communication between the network devices includes the first frame includes first allocation information used to indicate whether the first network device supports the communication between the network devices.

In still another possible implementation, the first allocation information includes a field used to indicate the communication between the network devices, and/or a field used to indicate a source network device identifier and a field used to indicate a target network device identifier.

In yet another possible implementation, the field indicating the communication between the network devices includes at least one of the following locations in the first frame: a reserved bit in an allocation control field in an allocation field in an extended schedule element, an allocation type field in the allocation control field in the allocation field in the extended schedule element, a source association identifier field and a destination association identifier field that are in the allocation field in the extended schedule element, a reserved bit in a channel allocation field in an enhanced directional multi-gigabit (EDMG) extended schedule element, a reserved bit in an allocation key field in the channel allocation field in the EDMG extended schedule element, and a source association identifier field and a destination association identifier field that are in the allocation key field in the channel allocation field in the EDMG extended schedule element.

In yet another possible implementation, the field indicating the source network device identifier and the field indicating the target network device identifier include at least one of the following locations in the first frame: a source association identifier field and a destination association identifier field that are in an allocation field in an extended schedule element, fields in an information element other than the extended schedule element in the first frame, a source association identifier field and a destination association identifier field that are in an allocation key field in a channel allocation field in an EDMG extended schedule element, and fields in an information element other than the EDMG extended schedule element in the first frame.

In yet another possible implementation, the field indicating the communication between the network devices includes an allocation type field in an allocation control field in an allocation field in an extended schedule element in the first frame, and the field indicating the source network device identifier and the field indicating the target network device identifier are a source association identifier field and a destination association identifier field that are in the allocation field in the extended schedule element in the first frame.

Alternatively, the field indicating the communication between the network devices includes an allocation type field in an allocation control field in an allocation field in an extended schedule element in the first frame, and a source association identifier field and a destination association identifier field that are in the allocation field, and the field indicating the source network device identifier and the field indicating the target network device identifier are fields in an information element other than the extended schedule element in the first frame.

Alternatively, the field indicating the communication between the network devices includes an allocation type field in an allocation control field in an allocation field in an extended schedule element in the first frame, and the field indicating the source network device identifier and the field indicating the target network device identifier are fields in an information element other than the extended schedule element in the first frame.

Alternatively, the field indicating the communication between the network devices includes a source association identifier field and a destination association identifier field that are in an allocation field in an extended schedule element in the first frame, and the field indicating the source network device identifier and the field indicating the target network device identifier are fields in an information element other than the extended schedule element in the first frame.

Alternatively, the field indicating the source network device identifier and the field indicating the target network device identifier are a source association identifier field and a destination association identifier field that are in an allocation field in an extended schedule element in the first frame.

In yet another possible implementation, the first frame further includes a field used to indicate a start time point and a field used to indicate duration.

In yet another possible implementation, the processing module is further configured to before controlling to transmit the information with the second network device, control to receive a second frame sent by the second network device, where the second frame is used to indicate whether the second network device supports the communication between the network devices, and the transceiver module is further configured to receive the second frame sent by the second network device.

In yet another possible implementation, that the second frame is used to indicate whether the second network device supports the communication between the network devices includes the second frame includes a bit used to indicate whether the second network device supports the communication between the network devices.

Alternatively, that the second frame is used to indicate whether the second network device supports the communication between the network devices includes the second frame is used for implicit indication by using a frame type.

In yet another possible implementation, that the second frame is used to indicate whether the second network device supports the communication between the network devices includes the second frame includes second allocation information used to indicate whether the second network device supports the communication between the network devices.

In yet another possible implementation, the second allocation information includes a field used to indicate the communication between the network devices, and/or a field used to indicate a source network device identifier and a field used to indicate a target network device identifier.

In yet another possible implementation, the field indicating the communication between the network devices includes at least one of the following locations in the second frame: a reserved bit in an allocation control field in an allocation field in an extended schedule element, an allocation type field in the allocation control field in the allocation field in the extended schedule element, a source association identifier field and a destination association identifier field that are in the allocation field in the extended schedule element, a reserved bit in a channel allocation field in an enhanced directional multi-gigabit (EDMG) extended schedule element, a reserved bit in an allocation key field in the channel allocation field in the EDMG extended schedule element, and a source association identifier field and a destination association identifier field that are in the allocation key field in the channel allocation field in the EDMG extended schedule element.

In yet another possible implementation, the field indicating the source network device identifier and the field indicating the target network device identifier include at least one of the following locations in the second frame: a source association identifier field and a destination association identifier field that are in an allocation field in an extended schedule element, fields in an information element other than the extended schedule element in the second frame, a source association identifier field and a destination association identifier field that are in an allocation key field in a channel allocation field in an EDMG extended schedule element, and fields in an information element other than the EDMG extended schedule element in the second frame.

In yet another possible implementation, the field indicating the communication between the network devices includes an allocation type field in an allocation control field in an allocation field in an extended schedule element in the second frame, and the field indicating the source network device identifier and the field indicating the target network device identifier are a source association identifier field and a destination association identifier field that are in the allocation field in the extended schedule element in the second frame.

Alternatively, the field indicating the communication between the network devices includes an allocation type field in an allocation control field in an allocation field in an extended schedule element in the second frame, and a source association identifier field and a destination association identifier field that are in the allocation field, and the field indicating the source network device identifier and the field indicating the target network device identifier are fields in an information element other than the extended schedule element in the second frame.

Alternatively, the field indicating the communication between the network devices includes an allocation type field in an allocation control field in an allocation field in an extended schedule element in the second frame, and the field indicating the source network device identifier and the field indicating the target network device identifier are fields in an information element other than the extended schedule element in the second frame.

Alternatively, the field indicating the communication between the network devices includes a source association identifier field and a destination association identifier field that are in an allocation field in an extended schedule element in the second frame, and the field indicating the source network device identifier and the field indicating the target network device identifier are fields in an information element other than the extended schedule element in the second frame.

Alternatively, the field indicating the source network device identifier and the field indicating the target network device identifier are a source association identifier field and a destination association identifier field that are in an allocation field in an extended schedule element in the second frame.

In yet another possible implementation, the second frame may further include a field used to indicate a start time point and a field used to indicate duration.

In yet another possible implementation, the processing module is configured to in an association beamforming training (A-BFT) period, control to receive a sweep frame sent by the second network device, and control to send a sweep feedback frame to the second network device, and the transceiver module is configured to receive the sweep frame sent by the second network device, and send the sweep feedback frame to the second network device.

Alternatively, the processing module is configured to in an announcement transmission slot (ATI), control to send a request frame to the second network device, and control to receive a response frame sent by the second network device, and the transceiver module is configured to send the request frame to the second network device, and receive the response frame sent by the second network device.

Alternatively, the processing module is configured to in a preset time period in a data transfer interval (DTI), control to receive a data frame, a control frame, or a management frame sent by the second network device, and control to send a data frame, a control frame, or a management frame to the second network device, and the transceiver module is configured to receive the data frame, the control frame, or the management frame sent by the second network device, and send the data frame, the control frame, or the management frame to the second network device.

According to a fifth aspect, this application may further provide a computer program product. The computer program product includes corresponding program code used to perform any information transmission method provided in the first aspect of the embodiments of this application.

According to a sixth aspect, an embodiment of this application further provides a computer readable storage medium, and the storage medium is configured to store a computer program product. The computer program product includes program code, and the program code may include corresponding program code used to perform any information transmission method provided in the first aspect of the embodiments of this application.

According to a seventh aspect, this application may further provide a computer program product. The computer program product includes corresponding program code used to perform any information transmission method provided in the second aspect of the embodiments of this application.

According to an eighth aspect, an embodiment of this application further provides a computer readable storage medium, and the storage medium is configured to store a computer program product. The computer program product includes program code, and the program code may include corresponding program code used to perform any information transmission method provided in the second aspect of the embodiments of this application.

According to the information transmission method and the network device that are provided in the embodiments of this application, the second network device may determine, based on the first frame obtained through listening that is sent by the first network device, whether the first network device supports the communication between the network devices, and if both the first network device and the second network device support the communication between the network devices, transmit the information with the first network device, so that information transmission between different network devices is implemented, to effectively ensure that the different network devices may perform operations such as interference management, resource management and allocation, and mobile handover management for user equipment through coordinated communication, so as to better use resources such as a time domain resource, a frequency domain resource, and a space resource.

BRIEF DESCRIPTION OF THE DRAWINGS

FIG. 4 is a schematic structural diagram 1 of a channel allocation field in an EDMG extended schedule element in a beacon frame in an information transmission method according to an embodiment of this application;

FIG. 6 is a schematic structural diagram 2 of an allocation key field in a channel allocation field in an EDMG extended schedule element in a beacon frame in an information transmission method according to an embodiment of this application;

FIG. 11 is a schematic structural diagram 1 of a cluster control field in a beacon frame in an information transmission method in this application;

FIG. 12 is a schematic structural diagram 2 of a cluster control field in a beacon frame in an information transmission method in this application;

DETAILED DESCRIPTION OF ILLUSTRATIVE EMBODIMENTS

An information transmission method and a network device that are provided in the embodiments of this application are applicable to a WLAN system, and in particular, to a WLAN system in the 802.11ad standard, the 802.11ay standard, and a subsequent improved standard thereof. For example, the information transmission method is applicable to a scenario formed by different BSSs. The different BSSs may be any two of a plurality of BSSs, for example, two adjacent BSSs. The different BSSs may alternatively be any two BSSs in a BSS cluster (BSS cluster). Each BSS may include at least one user equipment and one network device. For example, the network device may be a personal basic service set control point (PCP)/an access point (AP). The user equipment may be a station (STA).

It should be understood that the terms "first", "second", "third", and the like in this application are intended to distinguish between different objects but do not indicate a particular order. For example, without departing from the scope of the embodiments of this application, a first network device may also be referred to as a second network device. Similarly, the second network device may also be referred to as the first network device.

In addition, the terms "include" and "have" are not exclusive. For example, a process, a method, a system, a product, or a device including a series of steps or units is not limited to the listed steps or units, and may further include steps or units that are not listed.

Figure 1:
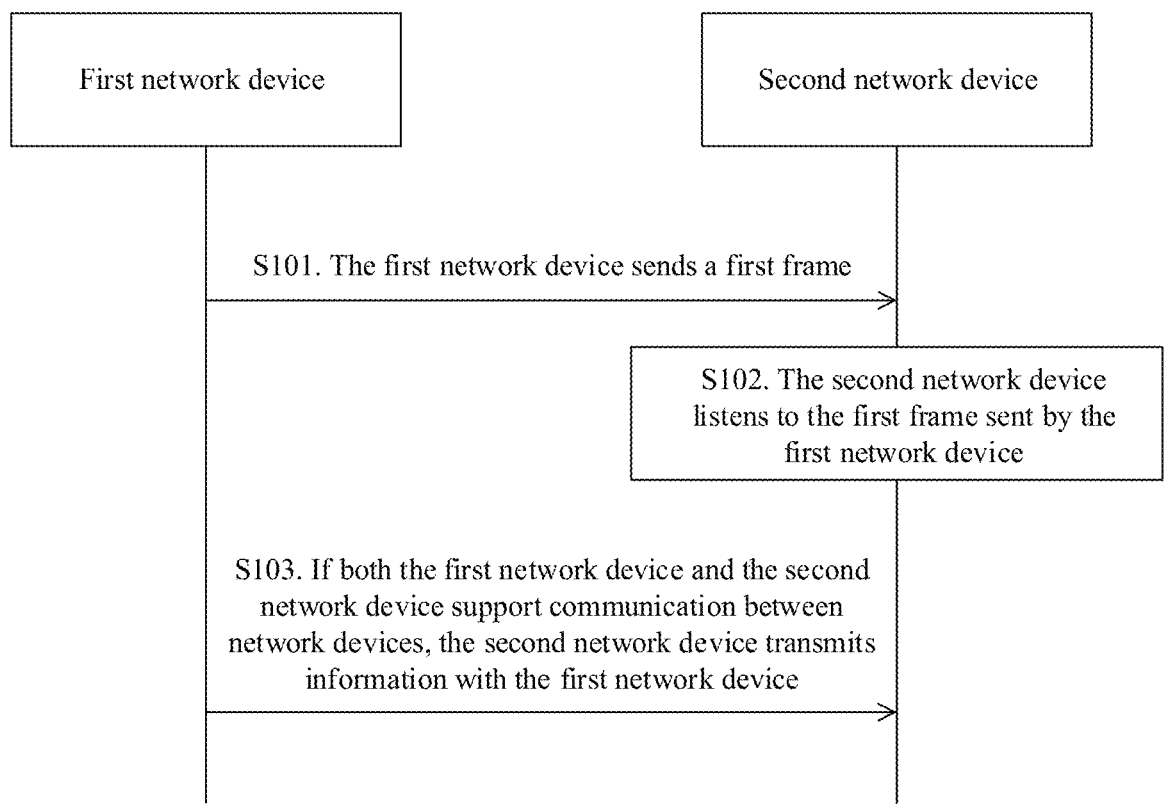
FIG. 1 is a flowchart of an information transmission method according to an embodiment of this application.

FIG. 1 is a flowchart of an information transmission method according to an embodiment of this application. As shown in FIG. 1, the information transmission method may include the following steps.

S101. A first network device sends a first frame.

The first network device may send the first frames in a plurality of sending directions. Each sending direction corresponds to one first frame. For each sending direction, the first network device may send the first frame in a broadcast or multicast manner.

The first network device may send the first frame on a preset channel. The preset channel may be a primary channel in a plurality of channels or any secondary channel in the plurality of channels. The first network device may further send the first frame on the plurality of channels.

The first frame may be used to indicate whether the first network device supports communication between network devices. The communication between the network devices may include training and/or coordination between the network devices.

S102. A second network device listens to the first frame sent by the first network device.

The first network device and the second network device may be network devices in different BSSs, for example, network devices in two adjacent BSSs. In other words, the first network device may be referred to as a neighbor network device of the second network device.

The second network device may obtain, through listening by using an omnidirectional receive (Omnidirectional RX) antenna, the first frame sent by the first network device.

If the first network device sends the first frames in the plurality of sending directions, the second network device may further determine information about a sending direction of the first network device based on the first frame obtained through listening. The information about the sending direction of the first network device may include at least one of the following information: an optimal sending direction of the first network device, a sequence of a plurality of sending directions of the first network device, and the like. The sending direction may be a sending direction corresponding to a transmit sector or a transmit beam. The information about the sending direction of the first network device may be determined by the second network device based on information such as a channel quality indicator (CQI) of the first frame obtained through listening that is sent in each sending direction. For example, the information about the sending direction of the first network device may be information about a transmit beam of the first network device, and may include an optimal transmit beam of the first network device and/or a sequence of a plurality of transmit beams of the first network device.

The second network device may listen, on a preset channel, to the first frame sent by the first network device, or may listen, on a plurality of channels, to the first frame sent by the first network device. The preset channel may be a primary channel in the plurality of channels or any secondary channel in the plurality of channels.

The first frame is used to indicate whether the first network device supports the communication between the network devices. In this case, after obtaining the first frame, the second network device may determine, based on the first frame, whether the first network device supports the communication between the network devices. For example, the second network device may determine, based on a type of the first frame and/or information carried in the first frame, whether the first network device supports the communication between the network devices.

S103. If both the first network device and the second network device support the communication between the network devices, the second network device transmits information with the first network device.

If the second network device supports the communication between the network devices, and the second network device may determine, based on the first frame sent by the first network device, that the first network device also supports the communication between the network devices, the second network device may transmit the information with the first network device. The second network device may masquerade as a station in a BSS in which the first network device is located, participate in a beacon interval (BI) of the first network device, and transmit the information with the first network device. That the second network device transmits information with the first network device includes the second network device transmits information to the first network device, and/or receives information transmitted by the first network device.

If both the first network device and the second network device support the communication between the network devices, the second network device may first perform beamforming training with the first network device, determine a directional link between the second network device and the first network device, and then transmit the information with the first network device by using the directional link. Alternatively, the second network device may transmit the information with the first network device in a process of performing beamforming training with the first network device. Alternatively, the second network device may transmit the information with the first network device in another phase. The directional link between the second network device and the first network device may include a directional transmit beam link between the second network device and the first network device and/or a directional receive beam link between the second network device and the first network device.

According to the information transmission method provided in this application, the second network device may determine, based on the first frame obtained through listening that is sent by the first network device, whether the first network device supports the communication between the network devices, and if both the first network device and the second network device support the communication between the network devices, transmit the information with the first network device, so that information transmission between different network devices is implemented, to effectively ensure that the different network devices may perform operations such as interference management, resource management and allocation, and mobile handover management for user equipment through coordinated communication, so as to better use resources such as a time domain resource, a frequency domain resource, and a space resource.

In an optional implementation, that the first frame is used to indicate whether the first network device supports communication between network devices may include the first frame includes a bit used to indicate whether the first network device supports the communication between the network devices.

The bit indicating whether the first network device supports the communication between the network devices may carry capability indication information indicating whether the first network device supports the communication between the network devices. In this case, the second network device may determine, based on the capability indication information, whether the first network device supports the communication between the network devices.

The capability indication information may include information indicating a capability of communication between network devices, and/or capability information that a network device supports a wireless mesh network or a distributed network. A PCP/an access point AP is used as an example. For example, the capability indication information may include inter-PCP/AP training and/or communication capability indication information and/or capability information that the PCP/AP supports the wireless mesh network or the distributed network.

The foregoing first frame may be a beacon frame, an announcement frame, a management frame, or another control frame.

A directional multi-gigabit beacon frame is used as an example. If the first frame is the beacon frame, the bit used to indicate whether the first network device supports the communication between the network devices may be located in a reserved field, a newly added field, a multiplexable field, or an extendable field in a directional multi-gigabit parameter field in a DMG beacon frame.

Figure 2:
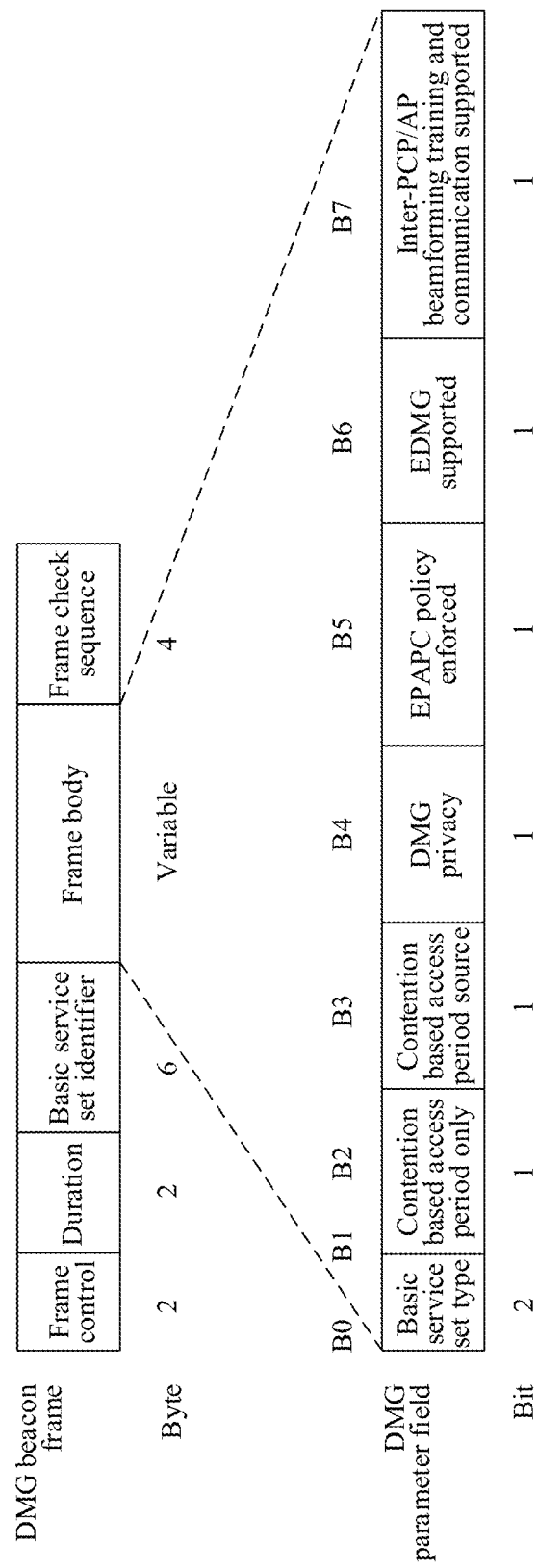
FIG. 2 is a schematic structural diagram of a DMG beacon frame in an information transmission method according to an embodiment of this application.

FIG. 2 is a schematic structural diagram of a DMG beacon frame in an information transmission method according to an embodiment of this application. As shown in FIG. 2, the DMG beacon frame may include a 2-byte frame control field, a 2-byte duration field, a 6-byte basic service set identifier (BSS ID) field, a variable-byte frame body (Frame Body) field, and a 4-byte frame check sequence (FCS) field.

The frame body field may include a 1-byte DMG parameter field. The DMG parameter field may include a 2-bit basic service set type (BSS Type) field, a 1-bit contention based access period only field, a 1-bit contention based access period source (CBAP Source) field, a 1-bit DMG privacy field, a 1-bit extended centralized access point or personal basic service set cluster (Extended centralized access point (AP) or personal basic service set (PBSS) control point (PCP) cluster, EPAPC) policy enforced field, a 1-bit enhanced directional multi-gigabit supported field, and a 1-bit inter-PCP/AP beamforming training and/or communication supported field.

The inter-PCP/AP beamforming training and/or communication supported field may be a reserved field in the DMG parameter field. The bit used to indicate whether the first network device supports the communication between the network devices may be located in the inter-PCP/AP beamforming training and/or communication supported field in the DMG parameter field in the DMG beacon frame shown in FIG. 2, namely, B7 shown in FIG. 2.

Different values of B7 may be used to indicate different capabilities of communication between network devices.

For example, if B7 has a bit value 1, B7 may be used to indicate that the first network supports the communication between the network devices, or if B7 has a bit value 0, B7 may be used to indicate that the first network does not support the communication between the network devices.

FIG. 2 merely shows a structure of the DMG beacon frame. The DMG beacon frame may alternatively be in another structure. Details are not described herein.

It should be noted that a location, in the first frame, of the bit indicating whether the first network device supports the communication between the network devices is described by using the DMG beacon frame as an example in FIG. 2. Alternatively, the bit indicating whether the first network device supports the communication between the network devices may be located in an EDMG beacon frame or another type of frame. This is not limited in this application.

In another optional implementation, that the first frame is used to indicate whether the first network device supports communication between network devices includes the first frame is used for implicit indication by using a frame type. To be specific, the first frame may alternatively not include the bit used to indicate whether the first network device supports the communication between the network devices, and whether the first network device supports the communication between the network devices is indicated by using the frame type of the first frame.

Specifically, different types of the first frame may correspond to different capabilities of communication between network devices.

For example, if the first frame is of a type 1, the frame type of the first frame may be used to indicate that the first network device supports the communication between the network devices. If the first frame is of a type 2, the frame type of the first frame may be used to indicate that the first network device does not support the communication between the network devices.

Certainly, regardless of whether the first frame includes the capability indication information, the first frame may further include other information. After obtaining the first frame through listening, the second network device may also learn of the other information carried in the first frame.

Optionally, when the second network device determines that both the first network device and the second network device support the communication between the network devices, in a process of transmitting information with the first network device, the second network device may transmit first transmission information to the first network device, and the first network device may transmit second transmission information to the second network device, so that information exchange between the first network device and the second network device is implemented. The first transmission information may be information transmitted by the second network device to the first network device, and may include capability information that the second network device supports a wireless mesh network or a distributed network. The second transmission information may be information transmitted by the first network device to the second network device, and may include capability information that the first network device supports a wireless mesh network or a distributed network.

It should be noted that in an information transmission process, the second network device may first transmit information to the first network device, and then the first network device transmits information to the second network device. Alternatively, the first network device may first transmit information to the second network device, and then the second network device transmits information to the first network device. In other words, in this application, in the information transmission process, the second network device may initiate information transmission, or the first network device may initiate information transmission.

The first network device may transmit information with the second network device in at least one of the following periods: an association beamforming training (A-BFT) period, an announcement transmission slot (ATI), a data transfer slot (DTI), and the like.

In an implementation, that the second network device transmits information with the first network device may include the following.

In the A-BFT period, the second network device sends a sweep frame to the first network device, for example, a sector sweep (SSW) frame, a short sector sweep (SSSW) frame, or another type of sweep frame, and the second network device receives a sweep feedback frame sent by the first network device, for example, a sector sweep feedback (SSW Feedback) frame, a short sector sweep feedback (SSSW Feedback) frame, or another type of sweep feedback frame. In other words, in the A-BFT period, the second network device may first transmit the information to the first network device.

For example, in the A-BFT period, the second network device may send the SSW frames to the first network device in a plurality of sending directions, and each sending direction corresponds to one SSW frame. Each SSW frame may carry information about a sending direction of the first network device. The information about the sending direction of the first network device may include at least one of the following information: an optimal sending direction of the first network device, a sequence of a plurality of sending directions of the first network device, and the like. In other words, in this case, the information transmitted by the second network device to the first network device may include the foregoing information about the sending direction of the first network device. Certainly, the information transmitted by the second network device to the first network device may further include other transmission information. Details are not described herein.

After receiving the SSW frame, the first network device may select a sending direction from the plurality of sending directions of the first network device based on the information about the sending direction of the first network device, and send the SSW feedback frame to the second network device in the selected sending direction, to implement directional sending from the first network device to the second network device. Therefore, in this implementation, the second network device sends the SSW frame to the first network device, so that the first network device can establish a directional sending link with the second network device.

The SSW feedback frame may carry information about a sending direction of the second network device. The information about the sending direction of the second network device may include at least one of the following information: an optimal sending direction of the second network device, a sequence of a plurality of sending directions of the second network device, and the like. In other words, in this case, the information transmitted by the first network device to the second network device may include the foregoing information about the sending direction of the second network device. Certainly, the information transmitted by the first network device to the second network device may further include other transmission information. Details are not described herein.

After receiving the SSW feedback frame, the second network device may select a sending direction from the plurality of sending directions of the second network device based on the information about the sending direction of the second network device, to send a subsequent frame of another type to the first network device, so as to implement directional sending from the second network device to the first network device. Therefore, in this implementation, the first network device sends the SSW feedback frame to the second network device, so that the second network device can establish a directional sending link with the first network device.

In this implementation, the second network device and the first network device may transmit the information about the sending directions in the A-BFT period, so that the second network device and the first network device may establish the directional sending links between the first network device and the second network device by performing beamforming training, to effectively ensure that information transmission between the first network device and the second network device is faster and more reliable, and reduce information exchange overheads and an information exchange delay.

It should be noted that after the directional transmission links between the first network device and the second network device are established, either of the first network device and the second network device may serve as a link maintenance party. For example, the first network device serves as the maintenance party, a timer is disposed on a side of the first network device, and the first network device periodically initiates a beam training process. Because relative locations of the first network device and the second network device are usually fixed, a link maintenance period, namely, duration that may be set by the timer, may be greater than or equal to preset duration, to reduce overheads as much as possible.

In another implementation, that the second network device transmits information with the first network device may include the following.

In the ATI, the second network device receives a request frame sent by the first network device, and the second network device sends a response frame or an acknowledgement frame (ACK frame) to the first network device. In other words, in the ATI, the first network device may first transmit the information to the second network device.

In the ATI, the first network device may first send the request frame to the second network device, and after receiving the request frame, the second network device sends the response frame to the first network device. In this implementation, the request frame may carry the information transmitted by the first network device to the second network device, and the response frame carries the information transmitted by the second network device to the first network device, to implement information transmission between the first network device and the second network device in the ATI.

In still another implementation, that the second network device transmits information with the first network device may include the following.

In a preset time period in the DTI, the second network device sends a data frame, a control frame, a management frame, or the like to the first network device, and the second network device receives a data frame, a control frame, a management frame, or the like sent by the first network device. For example, the preset time period may be referred to as a scheduling time period between network devices in the DTI. The preset time period may be a preset CBAP or a preset SP in the DTI. In the DTI, information transmission between the second network device and the first network device is not performed in sequence. The second network device may first transmit the information to the first network device, or may then transmit the information to the first network device.

In yet another possible implementation, information transmission between the first network device and the second network device may be alternatively performed in the A-BFT period and the ATI, or in the three phases, namely, the A-BFT period, the ATI, and the DTI.

An example in which the information transmission is performed in the A-BFT period and the ATI is used below for description. In the A-BF period, the SSW frame sent by the second network device to the first network device may carry a first part of transmission information. In the ATI, the response frame sent by the second network device to the first network device carries a second part of transmission information. The first part of transmission information and the second part of transmission information constitute the information transmitted by the second network device to the first network device. In addition, in the A-BFT period, the SSW feedback frame sent by the first network device to the second network device carries a third part of transmission information. In the ATI, the request frame sent by the first network device to the second network device may carry a fourth part of transmission information. The third part of transmission information and the fourth part of transmission information may constitute the information transmitted by the first network device to the second network device.

Figure 3:
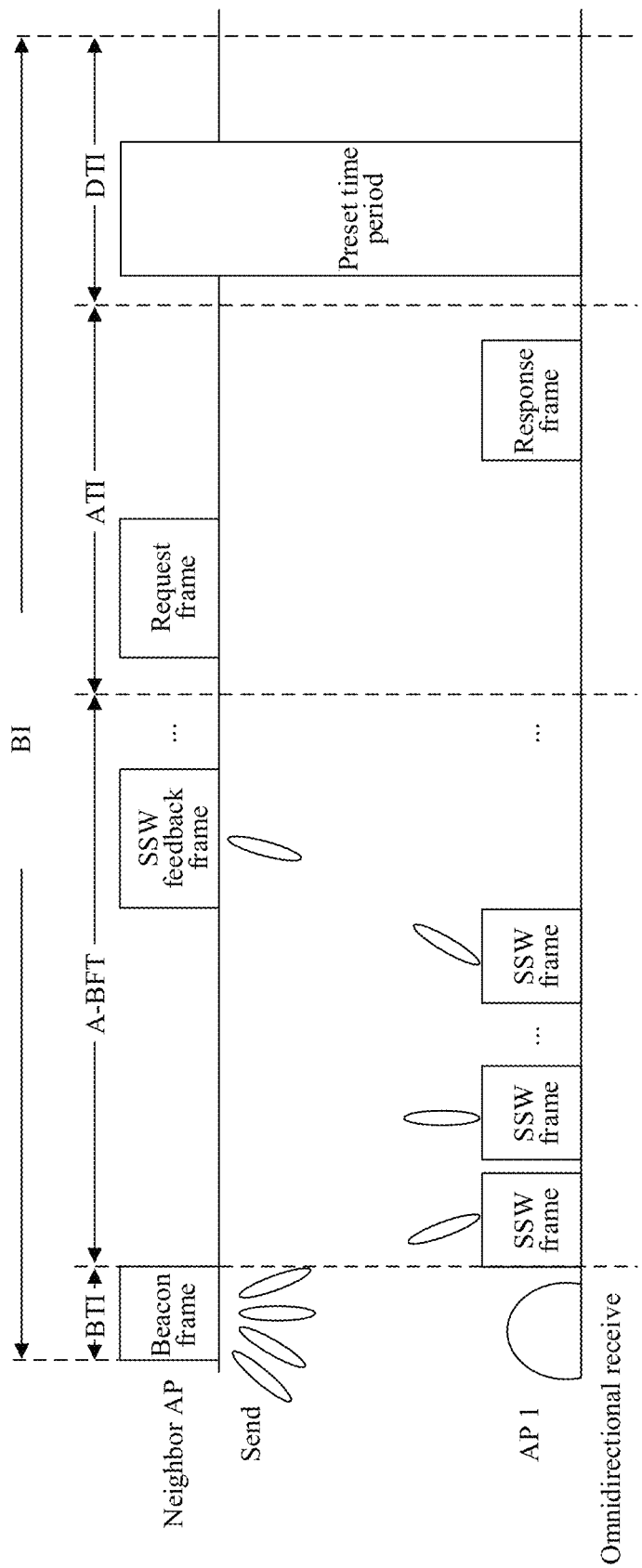
FIG. 3 is a flowchart 1 of signaling interaction between access points (APs) in an information transmission method in this application.

The foregoing implementations are described below in an instance by using an example in which a neighbor AP serves as the first network device and an AP 1 serves as the second network device. FIG. 3 is a flowchart 1 of signaling interaction between APs in an information transmission method in this application. As shown in FIG. 3, a BI may include a beacon transmission slot (Beacon Transmission Interval, BTI), an A-BFT period, an ATI, and a DTI. In the BTI, the neighbor AP may serve as the first network device, and send beacon frames in a plurality of sending directions, and the AP 1 serves as the second network device, and obtains, through listening by using an omnidirectional receive antenna, the beacon frame sent by the neighbor AP. The AP 1 may determine information about a sending direction of the neighbor AP based on the beacon frame obtained through listening. The AP 1 successively sends SSW frames to the neighbor AP in a plurality of sending directions, and each sending direction corresponds to one SSW frame. Each SSW frame may carry the information about the sending direction of the neighbor AP. After receiving the SSW frame, the neighbor AP may select a sending direction based on the information that is about the sending direction of the neighbor AP and that is carried in the SSW frame, and send an SSW feedback frame to the AP 1 in the selected sending direction. In the ATI, the neighbor AP sends a request frame to the AP 1 in the selected sending direction. In the ATI, the AP 1 may further send a response frame to the neighbor AP. The neighbor AP and the AP 1 may exchange a data frame, a control frame, a management frame, or the like in a preset time period in the DTI.

Based on the flowchart of the signaling interaction shown in FIG. 3, the neighbor AP and the AP 1 may transmit information by using the SSW frame and the SSW feedback frame in the A-BF period, or may transmit information by using the request frame and the response frame in the ATI, or may transmit information by using the data frame, the control frame, or the management frame in the DTI, or may transmit information in any combination of the A-BFT period, the ATI, and the DTI.

Optionally, because the first network device and the second network device have respective BIs, to ensure communication between network devices, the first frame may further include information used to indicate a scheduling time of the first network device. The information used to indicate the scheduling time of the first network device may include a field used to indicate a start time point and a field used to indicate duration. A device that obtains the first frame through listening or receives the first frame may learn of the scheduling time of the first network device based on the first frame.

The foregoing first frame may be a beacon frame in a BTI of the first network device. The field used to indicate the start time point may be located in a preset information element in an extended schedule element in the beacon frame in the BTI of the first network device, for example, an allocation start field in an allocation field in the extended schedule element. The field used to indicate the duration may be located in the preset information element in the extended schedule element in the beacon frame in the BTI of the first network device, for example, an allocation block duration field in the allocation field in the extended schedule element. Certainly, the field used to indicate the start time point and the field used to indicate the duration may be located in another information element in the extended schedule element in the beacon frame in the BTI of the first network device, for example, a newly added information element, a multiplexable information element, or an extendable information element in the extended schedule element. The field used to indicate the start time point and the field used to indicate the duration may alternatively be located in a preset information element in an EDMG extended schedule element in the beacon frame in the BTI of the first network device, for example, a newly added information element, a multiplexable information element, or an extendable information element in the EDMG extended schedule element.

Optionally, to ensure the communication between the network devices and avoid interference caused by user equipment in a BSS in which a network device is located to the communication between the network devices, that the first frame is used to indicate whether the first network device supports communication between network devices may include the first frame includes first allocation information used to indicate whether the first network device supports the communication between the network devices.

The first frame includes the first allocation information used to indicate whether the first network device supports the communication between the network devices, so that a device that obtains the first frame through listening or receives the first frame, for example, the second network device and a device in a BSS in which the first network device is located, can learn whether the first network device supports the communication between the network devices. In this implementation, that the first network device supports the communication between the network devices may include scheduling of the first network device, for example, a scheduling time of the first network device, is used for the communication between the network devices. That the first network device does not support the communication between the network devices may include scheduling of the first network device, for example, a scheduling time of the first network device, is used for communication between non-network devices, and is common scheduling.

For example, the first frame includes the first allocation information, so that the device that obtains the first frame through listening or receives the first frame, for example, the second network device and the device in the BSS in which the first network device is located, can learn whether information about a scheduled object allocated by the first network device indicates a network device or user equipment. If the information about the scheduled object indicates the network device, it may be determined that the scheduling of the first network device, for example, the scheduling time of the first network device, is used for the communication between the network devices. If the information about the scheduled object indicates the user equipment, it may be determined that the scheduling of the first network device, for example, the scheduling time of the first network device, is used for the communication between the non-network devices, and is the common scheduling.

If the first network device supports the communication between the network devices, and the second network device also supports the communication between the network devices, the second network device can transmit information with the first network device, and a non-network device in the BSS in which the first network device is located may not participate in the scheduling of the first network device. To be specific, the non-network device is silent in the scheduling time of the first network device and does not transmit information with the first network device.

Optionally, the first allocation information includes a field used to indicate the communication between the network devices, and/or a field used to indicate a source network device identifier and a field used to indicate a target network device identifier.

The field indicating the communication between the network devices may be used to indicate that scheduling of the first network device is used for the communication between the network devices, namely, two scheduling parties are network devices. To be specific, the first network device may send the first frame that includes the field indicating the communication between the network devices, to indicate, to the second network device and user equipment in a BSS in which the first network device is located, that current scheduling is used for the communication between the network devices, in other words, an object scheduled by the first network device is a network device. Therefore, the user equipment in the BSS in which the first network device is located may not participate in the scheduling of the first network device, to be specific, does not transmit information in a scheduling range, such as a scheduling time, of the first network device.

The source network device identifier and the target network device identifier refer to two devices that perform current scheduling. In an implementation, in the first allocation information, the field indicating the source network device identifier may carry an identifier of the first network device. In the first allocation information, the field indicating the target network device identifier may carry an identifier of the second network device. In another implementation, in the first allocation information, the field indicating the source network device identifier may further carry a multicast or broadcast address. In the first allocation information, the field indicating the target network device identifier may also carry the multicast or broadcast address. In still another implementation, in the first allocation information, the field indicating the source network device identifier may further carry a multicast or broadcast address. In the first allocation information, the field indicating the target network device identifier may also carry an identifier of the second network device. In yet another implementation, in the first allocation information, the field indicating the source network device identifier may further carry an identifier of the first network device. In the first allocation information, the field indicating the target network device identifier may also carry a multicast or broadcast address.

The field indicating the communication between the network devices, the field indicating the source network device identifier, and the field indicating the target network device identifier that are included in the first allocation information are separately described below by using an example in several instances. It should be noted that locations, in the first frame, of the field indicating the communication between the network devices, the field indicating the source network device identifier, and the field indicating the target network device identifier may not be limited to the following descriptions.

For example, the foregoing field indicating the communication between the network devices may include at least one of the following locations in the first frame: a reserved bit in an allocation control subfield in an allocation field in an extended schedule element, an allocation type field in the allocation control subfield in the allocation field in the extended schedule element, a source association identifier field and a destination association identifier field that are in the allocation field in the extended schedule element, a reserved bit in a channel allocation field in an EDMG extended schedule element, a reserved bit in an allocation key field in the channel allocation field in the EDMG extended schedule element, and a source association identifier field and a destination association identifier field that are in the allocation key field in the channel allocation field in the EDMG extended schedule element.

The field indicating the communication between the network devices that is included in the first allocation information is described below with reference to an instance.

In an instance, descriptions are provided by using an example in which the first field indicating the communication between the network devices that is included in the first allocation information is located in the reserved bit in the channel allocation field in the EDMG extended schedule element. FIG. 4 is a schematic structural diagram 1 of a channel allocation field in an EDMG extended schedule element in a beacon frame in an information transmission method according to an embodiment of this application. As shown in FIG. 4, if a value of a scheduling type field in the channel allocation field in the EDMG extended schedule element shown in FIG. 4 is a bit value 0, the channel allocation field may include a 1-bit scheduling type field, a 24-bit allocation key field, a 2-bit channel aggregation field, an 8-bit bandwidth (BW) field, a 1-bit asymmetric beamforming training field, a 9-bit receive direction field, a 1-bit inter-PCP/AP beamforming training or communication field, and a 3-bit reserved bit.

The inter-PCP/AP beamforming training or communication field may be located in a reserved bit in a channel allocation field in an existing EDMG extended schedule element. If the value of the scheduling type field in the channel allocation field in the EDMG extended schedule element shown in FIG. 4 is the bit value 0, the field indicating the communication between the network devices may be located in the inter-PCP/AP beamforming training or communication field in the channel allocation field in the EDMG extended schedule element shown in FIG. 4, namely, B44 shown in FIG. 4.

For example, if B44 has a bit value 1, the device that receives the first frame sent by the first network device or obtains the first frame through listening, for example, the second network device and the user equipment in the BSS in which the first network device is located, may determine that the scheduling of the first network device is used for the communication between the network devices, and the user equipment in the BSS in which the first network device is located may not participate in the scheduling of the first network device, to be specific, does not transmit information with the first network device. Alternatively, if B44 has a bit value 0, the device that receives the first frame sent by the first network device or obtains the first frame through listening, for example, the second network device and the user equipment in the BSS in which the first network device is located, may determine that the scheduling of the first network device is the common scheduling, and is not used for coordination between the network devices, to be specific, an object scheduled by the first network device is the user equipment. Therefore, the user equipment in the BSS in which the first network device is located can participate in the scheduling of the first network device and transmit information with the first network device.

FIG. 4 merely shows a structure of the channel allocation field. The channel allocation field may alternatively be in another structure. Details are not described herein.

Figure 5:
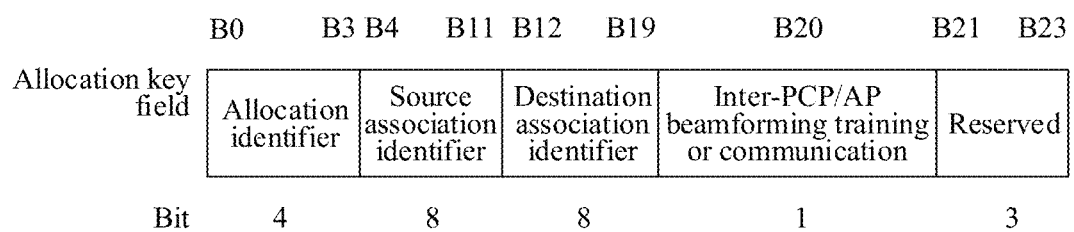
FIG. 5 is a schematic structural diagram of an allocation key field in a channel allocation field in an EDMG extended schedule element in a beacon frame in an information transmission method according to an embodiment of this application.

In another instance, descriptions are provided by using an example in which the field indicating the communication between the network devices that is included in the first allocation information is located in the reserved bit in the allocation key field in the channel allocation field in the EDMG extended schedule element. FIG. 5 is a schematic structural diagram of an allocation key field in a channel allocation field in an EDMG extended schedule element in a beacon frame in an information transmission method according to an embodiment of this application. As shown in FIG. 5, if the value of the scheduling type field in the channel allocation field in the EDMG extended schedule element shown in FIG. 4 is the bit value 0, the allocation key field in the channel allocation field may include a 4-bit allocation identifier field, an 8-bit source association identifier (source AID) field, an 8-bit destination association identifier (Destination AID) field, a 1-bit inter-PCP/AP beamforming training or communication field, and a 3-bit reserved bit.

The inter-PCP/AP beamforming training or communication field may be located in a reserved bit in an allocation key field in a channel allocation field in an existing EDMG extended schedule element. If the value of the scheduling type field in the channel allocation field in the EDMG extended schedule element shown in FIG. 4 is the bit value 0, the field indicating the communication between the network devices may be located in the inter-PCP/AP beamforming training or communication field in the allocation key field in the channel allocation field in the EDMG extended schedule element shown in FIG. 5, namely, B20 shown in FIG. 5.

For example, if B20 has a bit value 1, the device that receives the first frame sent by the first network device or obtains the first frame through listening, for example, the second network device and the user equipment in the BSS in which the first network device is located, may determine that the scheduling of the first network device is used for the communication between the network devices, to be specific, an object scheduled by the first network device is the network device, and the user equipment in the BSS in which the first network device is located may not participate in the scheduling of the first network device, to be specific, does not transmit information with the first network device. Alternatively, if B20 has a bit value 0, the device that receives the first frame sent by the first network device or obtains the first frame through listening, for example, the second network device and the user equipment in the BSS in which the first network device is located, may determine that the scheduling of the first network device is the common scheduling, and is not used for the communication between the network devices, to be specific, an object scheduled by the first network device is the user equipment. Therefore, the user equipment in the BSS in which the first network device is located can participate in the scheduling of the first network device and transmit information with the first network device.

Optionally, the field indicating the communication between the network devices may be further located in the source association identifier field and the destination association identifier field that are in the allocation key field in the channel allocation field in the EDMG extended schedule element shown in FIG. 5, namely, B4-B11 and B12-B19 that are shown in FIG. 5.

If a value of the source association identifier field and a value of the destination association identifier field each are a value of an identifier of user equipment in a BSS in which a non-first network device is located, for example, each are 0, in other words, the value of B4-B11 is 0 and the value of B12-B19 is also 0, the device that receives the first frame sent by the first network device or obtains the first frame through listening, for example, the second network device and the user equipment in the BSS in which the first network device is located, may determine that the scheduling of the first network device is used for the communication between the network devices, to be specific, each object scheduled by the first network device is the network device. Therefore, the user equipment in the BSS in which the first network device is located may not participate in the scheduling of the first network device, to be specific, does not transmit information with the first network device. Certainly, the value of the identifier of the user equipment in the BSS in which the non-first network device is located may alternatively be another value. Details are not described herein.

FIG. 5 merely shows a structure of the allocation key field in the channel allocation field. The allocation key field in the channel allocation field may alternatively be in another structure. Details are not described herein.

In still another instance, an example in which the field indicating the communication between the network devices that is included in the first allocation information is located in the reserved field in the channel allocation field in the EDMG extended schedule element is further used for description. FIG. 6 is a schematic structural diagram 2 of an allocation key field in a channel allocation field in an EDMG extended schedule element in a beacon frame in an information transmission method according to an embodiment of this application. As shown in FIG. 6, if a value of a scheduling type field in the channel allocation field in the EDMG extended schedule element shown in FIG. 6 is a bit value 1, the channel allocation field in the EDMG extended schedule element may include a 1-bit scheduling type field, a 2-bit channel aggregation field, an 8-bit bandwidth field, a 1-bit asymmetric beamforming training field, a 9-bit receive direction field, a 1-bit inter-PCP/AP beamforming training or communication field, a 3-bit reserved bit, and an (8×15)-bit allocation field.

The inter-PCP/AP beamforming training or communication field may be located in a reserved bit in a channel allocation field in an existing EDMG extended schedule element. If the value of the scheduling type field in the channel allocation field in the EDMG extended schedule element shown in FIG. 6 is the bit value 1, the field indicating the communication between the network devices may be located in the inter-PCP/AP beamforming training or communication field in the channel allocation field in the EDMG extended schedule element shown in FIG. 6, namely, B20 shown in FIG. 6.

For example, if B20 has a bit value 1, the device that receives the first frame sent by the first network device or obtains the first frame through listening, for example, the second network device and the user equipment in the BSS in which the first network device is located, may determine that the scheduling of the first network device is used for the communication between the network devices, to be specific, an object scheduled by the first network device is the network device, and the user equipment in the BSS in which the first network device is located may not participate in the scheduling of the first network device, to be specific, does not transmit information with the first network device. Alternatively, if B20 has a bit value 0, the device that receives the first frame sent by the first network device or obtains the first frame through listening, for example, the second network device and the user equipment in the BSS in which the first network device is located, may determine that the scheduling of the first network device is the common scheduling, and is not used for the communication between the network devices, to be specific, an object scheduled by the first network device is the user equipment. Therefore, the user equipment in the BSS in which the first network device is located can participate in the scheduling of the first network device and transmit information with the first network device.

FIG. 6 merely shows a structure of the channel allocation field. The channel allocation field may alternatively be in another structure. Details are not described herein.

Figure 7:
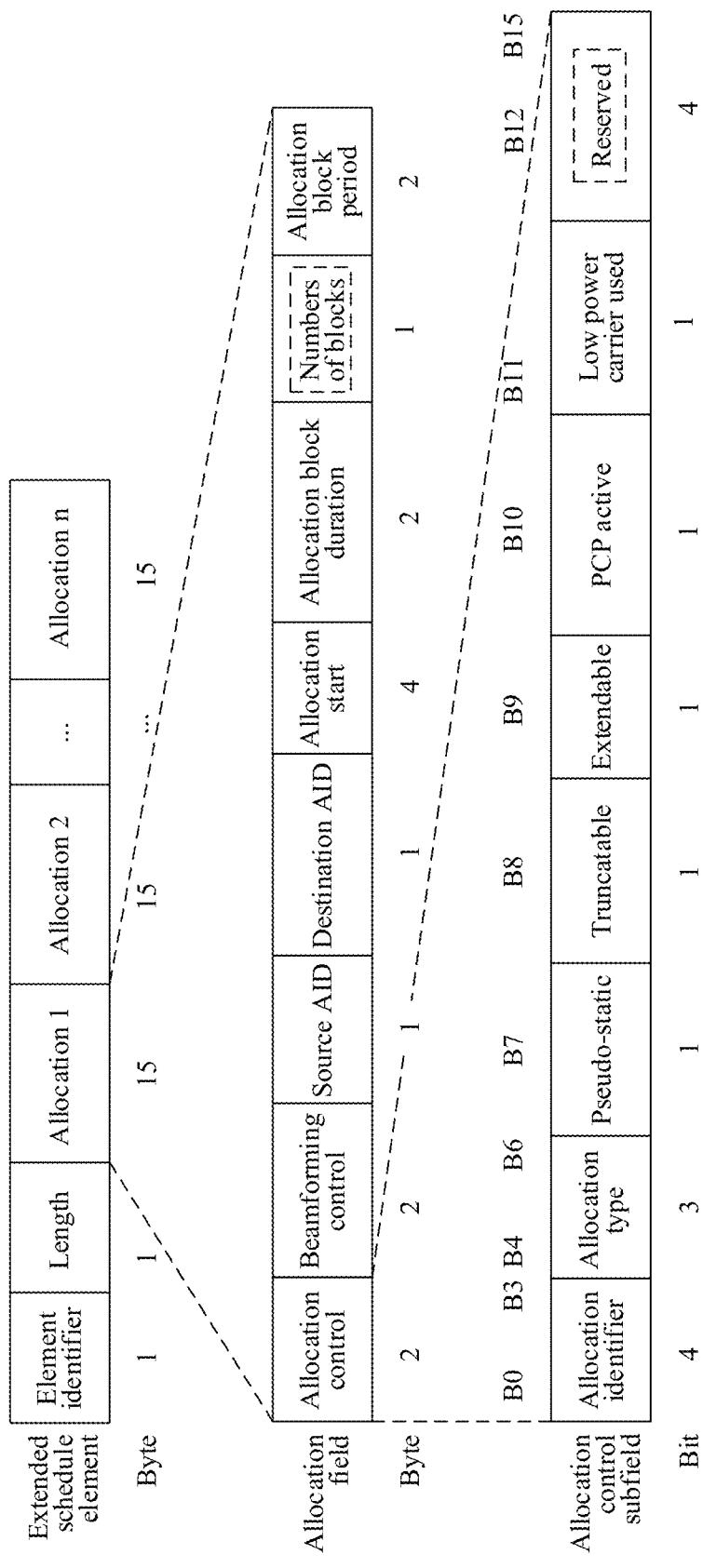
FIG. 7 is a schematic structural diagram of an allocation field in an extended schedule element in a beacon frame in an information transmission method according to an embodiment of this application.

In yet another instance, descriptions are provided by using an example in which the field indicating the communication between the network devices that is included in the first allocation information is located in the reserved bit in the allocation control subfield in the allocation field in the extended schedule element. FIG. 7 is a schematic structural diagram of an allocation field in an extended schedule element in a beacon frame in an information transmission method according to an embodiment of this application. As shown in FIG. 7, the extended schedule element includes a 1-byte element identifier field, a 1-byte length field, and n allocation fields. Each allocation field has 15 bytes. Each allocation field includes a 2-byte allocation control field, a 2-byte beamforming control (BF control) field, a 1-byte source AID field, a 1-byte destination AID field, a 4-byte allocation start field, a 2-byte allocation block duration field, a 1-byte numbers of blocks subfield, and a 2-byte allocation block period field.

The allocation control field may include a 4-bit allocation identifier (Allocation ID) field, a 3-bit allocation type field, a 1-bit pseudo-static field, a 1-bit truncatable field, a 1-bit extendable field, a 1-bit personal basic service set active (PCP Active) field, a 1-bit low power single carrier used (LP SC Used) field, and a four-bit reserved bit.

The field indicating the communication between the network devices may be located in the reserved bit in the allocation control field in the allocation field in the extended schedule element shown in FIG. 7, namely, any bit in B12-B15 shown in FIG. 7.

B12 is used as an example. If B12 has a bit value 1, the device that receives the first frame sent by the first network device or obtains the first frame through listening, for example, the second network device and the user equipment in the BSS in which the first network device is located, may determine that the scheduling of the first network device is used for the communication between the network devices, to be specific, an object scheduled by the first network device is the network device, and the user equipment in the BSS in which the first network device is located may not participate in the scheduling of the first network device, to be specific, does not transmit information with the first network device. Alternatively, if B12 has a bit value 0, the device that receives the first frame sent by the first network device or obtains the first frame through listening, for example, the second network device and the user equipment in the BSS in which the first network device is located, may determine that the scheduling of the first network device is the common scheduling, and is not used for the communication between the network devices, to be specific, an object scheduled by the first network device is the user equipment. Therefore, the user equipment in the BSS in which the first network device is located can participate in the scheduling of the first network device and transmit information with the first network device.

Optionally, the field indicating the communication between the network devices may be further located in the allocation type field, namely, B4-B6, in the allocation control field in the allocation field shown in FIG. 7.

For example, if a value of B4-B6 is 000, the device that receives the first frame sent by the first network device or obtains the first frame through listening, for example, the second network device and the user equipment in the BSS in which the first network device is located, may determine that the scheduling of the first network device is used for SP allocation. The SP allocation may be used for a non-contention-based network device and non-contention-based user equipment, or non-contention-based user equipment. Objects scheduled by the first network device are the user equipment, or the user equipment and the network device. If a value of B4-B6 is 100, the device that receives the first frame sent by the first network device or obtains the first frame through listening, for example, the second network device and the user equipment in the BSS in which the first network device is located, may determine that the scheduling of the first network device is used for CBAP allocation. The CBAP allocation may be used for a contention-based network device and contention-based user equipment, or contention-based user equipment. Objects scheduled by the first network device are the user equipment, or the user equipment and the network device. If a value of B4-B6 is a "value indicating the communication between the network devices", for example, 10, where 10 is the "value indicating the communication between the network devices" agreed on by each network element in a communications system, the device that receives the first frame sent by the first network device or obtains the first frame through listening, for example, the second network device and the user equipment in the BSS in which the first network device is located, may determine that the scheduling of the first network device is used for the communication between the network devices, to be specific, each object scheduled by the first network device is the network device. Therefore, the user equipment in the BSS in which the first network device is located may not participate in the scheduling of the first network device, to be specific, does not transmit information with the first network device. It should be noted that to implement a same or similar function, the foregoing "value indicating the communication between the network devices" may also be replaced with 000, 11, 101, 110, or 111.

FIG. 7 merely shows a structure of the allocation control field in the allocation field. The allocation control subfield in the allocation field may alternatively be in another structure. Details are not described herein.

Optionally, the field indicating the communication between the network devices may be further located in the source association identifier field and the destination association identifier field that are in the allocation field in the extended schedule element shown in FIG. 7.

If a value of the source association identifier field and a value of the destination association identifier field each may be a value of an identifier of user equipment in a BSS in which a non-first network device is located, for example, each are 0, in other words, the value of the source association identifier field in FIG. 7 is 0 and the value of the destination association identifier field in FIG. 7 is also 0, the device that receives the first frame sent by the first network device or obtains the first frame through listening, for example, the second network device and the user equipment in the BSS in which the first network device is located, may determine that the scheduling of the first network device is used for the communication between the network devices, to be specific, each object scheduled by the first network device is the network device. Therefore, the user equipment in the BSS in which the first network device is located may not participate in the scheduling of the first network device, to be specific, does not transmit information with the first network device. Certainly, the value of the identifier of the user equipment in the BSS in which the non-first network device is located may alternatively be another value. Details are not described herein.

For example, the foregoing field indicating the source network device identifier and the foregoing field indicating the target network device identifier may include at least one of the following locations in the first frame: a source association identifier field and a destination association identifier field that are in an allocation field in an extended schedule element, a newly added information element, a multiplexable information element, an extendable information element, or an information element other than the extended schedule element, a source association identifier field and a destination association identifier field that are in an allocation key field in a channel allocation field in an EDMG extended schedule element, and a newly added information element, a multiplexable information element, an extendable information element, or an information element other than the EDMG extended schedule element.

Regardless of locations of the field used to indicate the source network device identifier and the field used to indicate the target network device identifier, both the field used to indicate the source network device identifier and the field used to indicate the target network device identifier can enable a network device that obtains, through listening, a frame in which the network device is located to accurately determine two scheduling parties, so as to distinguish between other devices.

The field used to indicate the source network device identifier and the field used to indicate the target network device identifier are described below with reference to an instance.

In an instance, descriptions are provided by using an example in which the field indicating the source network device identifier and the field indicating the target network device identifier that are included in the first allocation information are located in the source association identifier field and the destination association identifier field that are in the allocation key field in the channel allocation field in the EDMG extended schedule element. Referring to FIG. 5, the field indicating the source network device identifier and the field indicating the target network device identifier may be located in the source association identifier field and the destination association identifier field that are in the allocation key field in the channel allocation field in the EDMG extended schedule element shown in FIG. 5, namely, B4-B11 and B12-B19 that are shown in FIG. 5.

The field indicating the source network device identifier may be located in the source association identifier field, namely, B4-B11, in the allocation key field in the channel allocation field in the EDMG extended schedule element shown in FIG. 5. The field indicating the target network identifier may be located in the destination association identifier field, namely, B12-B19, in the allocation key field in the channel allocation field in the EDMG extended schedule element shown in FIG. 5.

In the first allocation information, a value of the field indicating the source network device identifier, namely, the value of B4-B11 shown in FIG. 5, may be a value of an identifier of the first network device, and a value of the field indicating the target network device identifier, namely, the value of B12-B19 shown in FIG. 5, may be a value of an identifier of the second network device.

In another instance, descriptions are provided by using an example in which the field indicating the source network device identifier and the field indicating the target network device identifier that are included in the first allocation information are located in the source association identifier field and the destination association identifier field that are in the allocation field in the extended schedule element. Referring to FIG. 7, the field indicating the source network device identifier and the field indicating the target network device identifier may be located in the source association identifier field and the destination association identifier field that are in the allocation field in the extended schedule element shown in FIG. 7.

The field indicating the source network device identifier may be located in the source association identifier field in the allocation field in the extended schedule element shown in FIG. 7. The field indicating the target network identifier may be located in the destination association identifier field in the allocation field in the extended schedule element shown in FIG. 7.

In the first allocation information, a value of the field indicating the source network device identifier, namely, the value of the source association identifier field shown in FIG. 7, may be a value of an identifier of the first network device, and a value of the field indicating the target network device identifier, namely, the value of the destination association identifier field shown in FIG. 7, may be a value of an identifier of the second network device.

Regardless of locations of the field used to indicate the source network device identifier and the field used to indicate the target network device identifier, the foregoing source network device identifier includes at least one of the following, including a media access control (MAC) address of the source network device, an identifier of a BSS in which the source network device is located, an AID of the BSS in which the source network device is located, an identifier obtained by preprocessing at least one of the foregoing identifiers, and the like. The target network device identifier includes at least one of the following, including a MAC address of the target network device, an identifier of a BSS in which the target network device is located, an AID of the BSS in which the target network device is located, an identifier obtained by preprocessing at least one of foregoing identifiers, and the like. For example, the preprocessing may include at least one processing manner such as scrambling processing or hash processing.

The first allocation information indicating whether the first network device supports the communication between the network devices that is included in the first frame is described below by using an example with reference to a plurality of instances.

In a first possible implementation, the first allocation information may include a field used to indicate the communication between the network devices, and a field used to indicate a source network device identifier and a field used to indicate a target network device identifier.

The field indicating the communication between the network devices may be the allocation type field, namely, B4-B6, in the allocation control field in the allocation field in the extended schedule element shown in FIG. 7. The field indicating the source network device identifier and the field indicating the target network device identifier may be the source association identifier field and the destination association identifier field that are in the allocation field in the extended schedule element shown in FIG. 7.

If a value of the allocation type field, namely, B4-B6, in the allocation control field in the allocation field in the extended schedule element shown in FIG. 7 is a "value indicating the communication between the network devices", for example, 10, where 10 is the "value indicating the communication between the network devices" agreed on by each network element in a communications system, the device that obtains the first frame through listening or receives the first frame, for example, the second network device and the user equipment in the BSS in which the first network device is located, may determine that the scheduling of the first network device is used for the communication between the network devices, to be specific, each object scheduled by the first network device is the network device.

If a value of the source association identifier field in the allocation field in the extended schedule element shown in FIG. 7 may be an identifier of the first network device, for example, some MAC addresses of the first network device, all MAC addresses of the first network device, or an AID of a BSS in which the first network device is located, and a value of the destination association identifier field in the allocation field in the extended schedule element shown in FIG. 7 may be an identifier of the second network device, for example, some MAC addresses of the second network device, all MAC addresses of the second network device, or an AID of a BSS in which the second network device is located, the device that obtains the first frame through listening or receives the first frame, for example, the second network device and the user equipment in the BSS in which the first network device is located, may determine that a source network device that performs current scheduling is the first network device, and a target network device is the second network device, to distinguish between other devices. The some MAC addresses of the first network device may be addresses obtained after all the MAC addresses of the first network device are processed. In this way, there is a mapping relationship between all the MAC addresses and the some MAC addresses. The some MAC addresses of the second network device may be addresses obtained after all the MAC addresses of the second network device are processed. In this way, there is a mapping relationship between all the MAC addresses and the some MAC addresses. Regardless of the first network device or the second network device, the processing may include truncation processing, scrambling processing, or another type of processing. For example, all the MAC addresses may be 48-bit MAC addresses.

In a second possible implementation, the first allocation information may include a field used to indicate the communication between the network devices, and a field used to indicate a source network device identifier and a field used to indicate a target network device identifier. The field indicating the communication between the network devices may include the allocation type field, namely, B4-B6, that may be located in the allocation control field in the allocation field in the extended schedule element shown in FIG. 7, and the source association identifier field and the destination association identifier field that are in the allocation field in the extended schedule element shown in FIG. 7. The field indicating the source network device identifier and the field indicating the target network device identifier may be fields in an information element other than the extended schedule element in the first frame, for example, fields in a newly added information element, a multiplexable information element, an extendable information element, or another information element.

For example, if a value of the allocation type field, namely, B4-B6, in the allocation control field in the allocation field in the extended schedule element shown in FIG. 7 is a "value indicating the communication between the network devices", for example, 10, where 10 is the "value indicating the communication between the network devices" agreed on by each network element in a communications system, the device that obtains the first frame through listening or receives the first frame, for example, the second network device and the user equipment in the BSS in which the first network device is located, may determine that the scheduling of the first network device is used for the communication between the network devices, to be specific, each object scheduled by the first network device is the network device.

In addition, if a value of the source association identifier field and a value of the destination association identifier field in the allocation field in the extended schedule element shown in FIG. 7 each are a value of an identifier of user equipment in a BSS in which a non-first network device is located, for example, each are 0, the device that obtains the first frame through listening or receives the first frame, for example, the second network device and the user equipment in the BSS in which the first network device is located, may further determine that the scheduling of the first network device is used for the communication between the network devices, to be specific, an object scheduled by the first network device is the network device.

If a source address included in a newly added information element, a multiplexable information element, an extendable information element, or another information element in the first frame is an identifier of the first network device, for example, all MAC addresses of the first network device or an AID of a BSS in which the first network device is located, and a target address is an identifier of the second network device, for example, all MAC addresses of the second network device or an AID of a BSS in which the second network device is located, the device that obtains the first frame through listening or receives the first frame, for example, the second network device and the user equipment in the BSS in which the first network device is located, may determine that a source network device that performs current scheduling is the first network device, and a target network device is the second network device, to distinguish between other devices.

In a third possible implementation, the first allocation information may include a field used to indicate the communication between the network devices, and a field used to indicate a source network device identifier and a field used to indicate a target network device identifier. The field indicating the communication between the network devices may be the allocation type field, namely, B4-B6, in the allocation control field in the allocation field in the extended schedule element shown in FIG. 7. The field indicating the source network device identifier and the field indicating the target network device identifier may be included in a newly added information element, a multiplexable information element, an extendable information element, or an information element other than the extended schedule element in the first frame.

If a value of the allocation type field, namely, B4-B6, in the allocation control field in the allocation field in the extended schedule element shown in FIG. 7 is a "value indicating the communication between the network devices", for example, 10, where 10 is the "value indicating the communication between the network devices" agreed on by each network element in a communications system, the device that obtains the first frame through listening or receives the first frame, for example, the second network device and the user equipment in the BSS in which the first network device is located, may determine that the scheduling of the first network device is used for the communication between the network devices, to be specific, an object scheduled by the first network device is the network device.

If a source address included in a newly added information element, a multiplexable information element, an extendable information element, or another information element in the first frame is an identifier of the first network device, for example, all MAC addresses of the first network device or an AID of a BSS in which the first network device is located, and a target address is an identifier of the second network device, for example, all MAC addresses of the second network device or an AID of a BSS in which the second network device is located, the device that obtains the first frame through listening or receives the first frame, for example, the second network device and the user equipment in the BSS in which the first network device is located, may determine that a source network device that performs current scheduling is the first network device, and a target network device is the second network device, to distinguish between other devices.

In a fourth possible implementation, the first allocation information may include a field used to indicate the communication between the network devices, and a field used to indicate a source network device identifier and a field used to indicate a target network device identifier. For example, the field indicating the communication between the network devices may be the source association identifier field and the destination association identifier field that are in the allocation field in the extended schedule element shown in FIG. 7. For example, the field indicating the source network device identifier and the field indicating the target network device identifier may be located in a newly added information element, a multiplexable information element, an extendable information element, or another information element in the first frame.

If a value of the source association identifier field and a value of the destination association identifier field in the allocation field in the extended schedule element shown in FIG. 7 each are a value of an identifier of user equipment in a BSS in which a non-first network device is located, for example, each are 0, the device that obtains the first frame through listening or receives the first frame, for example, the second network device and the user equipment in the BSS in which the first network device is located, may determine that the scheduling of the first network device is used for the communication between the network devices, to be specific, each object scheduled by the first network device is the network device.

If a source address included in a newly added information element, a multiplexable information element, an extendable information element, or another information element in the first frame is an identifier of the first network device, for example, all MAC addresses of the first network device or an AID of a BSS in which the first network device is located, and a target address is an identifier of the second network device, for example, all MAC addresses of the second network device or an AID of a BSS in which the second network device is located, the device that obtains the first frame through listening or receives the first frame, for example, the second network device and the user equipment in the BSS in which the first network device is located, may determine that a source network device that performs current scheduling is the first network device, and a target network device is the second network device, to distinguish between other devices.

In a fifth possible implementation, the first allocation information may include a field used to indicate a source network device identifier and a field used to indicate a target network device identifier. The field indicating the source network device identifier and the field indicating the target network device identifier are the source association identifier field and the destination association identifier field that are in the allocation field in the extended schedule element shown in FIG. 7.

If a value of the source association identifier field in the allocation field in the extended schedule element shown in FIG. 7 may be an identifier of the first network device, for example, some MAC addresses of the first network device, all MAC addresses of the first network device, or an AID of a BSS in which the first network device is located, and a value of the destination association identifier field in the allocation field in the extended schedule element shown in FIG. 7 may be an identifier of the second network device, for example, some MAC addresses of the second network device, all MAC addresses of the second network device, or an AID of a BSS in which the second network device is located, the device that obtains the first frame through listening or receives the first frame, for example, the second network device and the user equipment in the BSS in which the first network device is located, may determine that a source network device that performs current scheduling is the first network device, and a target network device is the second network device, to distinguish between other devices. The some MAC addresses of the first network device may be addresses obtained after all the MAC addresses of the first network device are processed. In this way, there is a mapping relationship between all the MAC addresses and the some MAC addresses. The some MAC addresses of the second network device may be addresses obtained after all the MAC addresses of the second network device are processed. In this way, there is a mapping relationship between all the MAC addresses and the some MAC addresses. Regardless of the first network device or the second network device, the processing may include truncation processing, scrambling processing, or another type of processing. For example, all the MAC addresses may be 48-bit MAC addresses.

In this implementation, the AID of the BSS in which the first network device is located and the AID of the BSS in which the second network device is located may be centrally allocated based on a central controller or the like. Alternatively, each network device may select, based on an AID that is of a surrounding BSS and that is obtained through listening, an identifier different from the AID that is of the BSS and that is obtained by the network device through listening.

It should be noted that a specific implementation of the first allocation information used to indicate whether the first network device supports the communication between the network devices that is included in the first frame is not limited to the foregoing five implementations. The foregoing description is merely an example, and is not limited in this application.

Optionally, on the basis of any one of the foregoing information transmission methods, before the first network device transmits the information with the second network device in S103, the method may further include the following.

The second network device sends a second frame to the first network device, and the second frame is used to indicate whether the second network device supports the communication between the network devices.

When learning that the first network device supports the communication between the network devices, the second network device may further send the second frame to the first network device, so that the first network device learns that the second network device also supports the communication between the network devices, to effectively ensure information transmission between the network devices.

In an implementation, that the second frame may be used to indicate whether the second network device supports the communication between the network devices includes the second frame includes a bit used to indicate whether the second network device supports the communication between the network devices.

A location, in the second frame, of the bit used to indicate whether the second network device supports the communication between the network devices may be similar to or the same as the location, in the first frame, of the bit used to indicate whether the first network device supports the communication between the network devices. For detailed descriptions, refer to the foregoing descriptions. Details are not described herein again.

In another implementation, that the second frame is used to indicate whether the second network device supports the communication between the network devices may include the second frame is used for implicit indication by using a frame type.

Specific implementation and descriptions of implicitly indicating, by using the frame type, whether the second network device supports the communication between the network devices are similar to or the same as those of implicitly indicating, by using the frame type, whether the first network device supports the communication between the network devices. For details, refer to the foregoing descriptions. The details are not described herein again.

Optionally, that the second frame is used to indicate whether the first network device supports the communication between the network devices includes the second frame includes second allocation information used to indicate whether the second network device supports the communication between the network devices.

For specific implementation and details of the second allocation information are similar to those of the first allocation information. For details, refer to the foregoing descriptions. The details are not described herein again.

Optionally, the second allocation information may include a field used to indicate the communication between the network devices, and/or a field used to indicate a source network device identifier and a field used to indicate a target network device identifier.

Descriptions of the field used to indicate the communication between the network devices and/or the field used to indicate the source network device identifier and the field used to indicate the target network device identifier that are/is included in the second allocation information are similar to those of a corresponding field in the first allocation information. For details, refer to the foregoing descriptions. The details are not described herein again.

Optionally, the second frame further includes a field used to indicate a start time point and a field used to indicate duration.

Descriptions of the field used to indicate the start time point and the field used to indicate the duration that are in the second frame are similar to those of corresponding fields in the first frame. For details, refer to the foregoing descriptions. The details are not described herein again.

Because the first network device and the second network device have respective BIs, to ensure communication between network devices and avoid a slot conflict, the first network device and the second network device need to perform time scheduling negotiation, so that a network device can transmit information with a peer network device based on the scheduling negotiation. Descriptions are separately provided below by using an example in two different scheduling negotiation manners.

Figure 8:
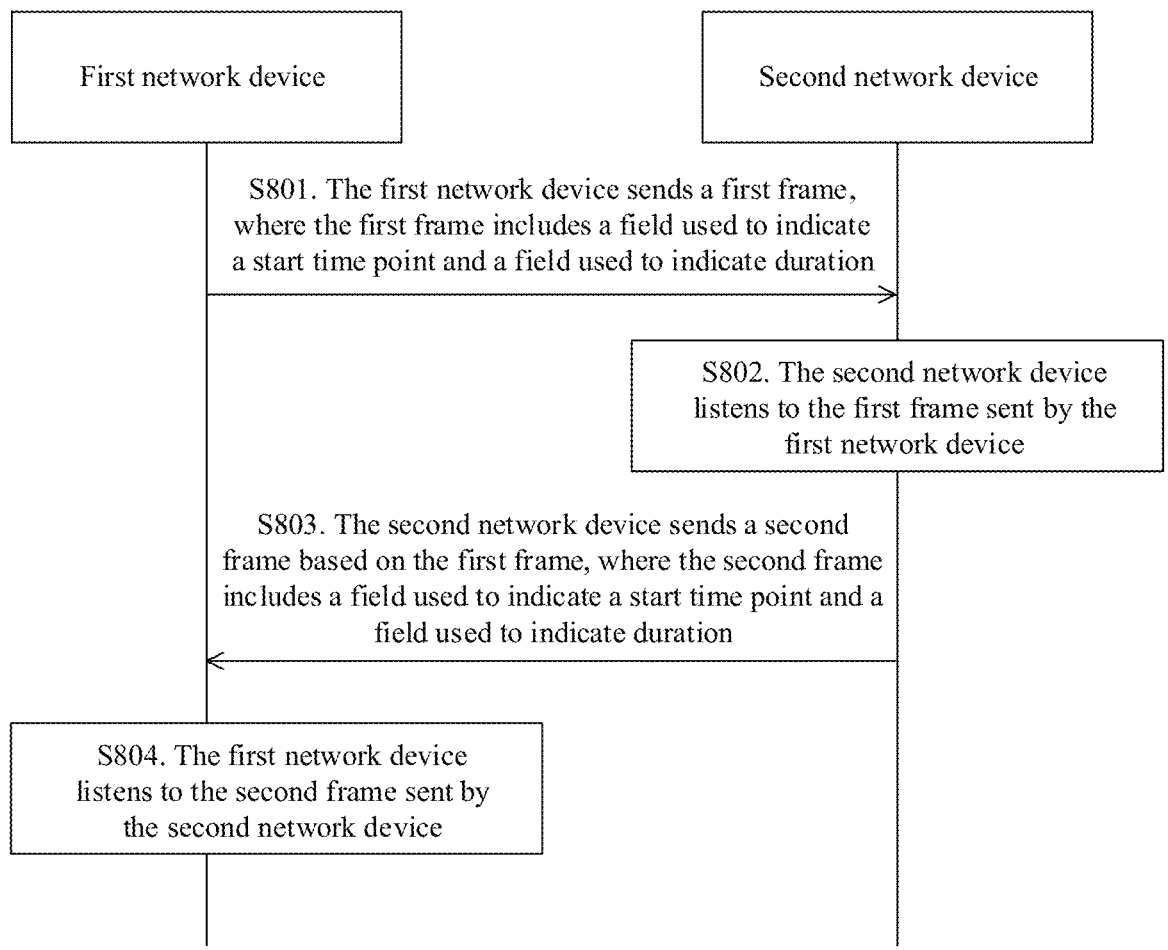
FIG. 8 is a flowchart of a method in which a first network device initiates scheduling in an information transmission method in this application.

In an implementation, scheduling between network devices may be initiated by the first network device. FIG. 8 is a flowchart of a method in which a first network device initiates scheduling in an information transmission method in this application. The method may include the following steps.

S801. The first network device sends a first frame, where the first frame includes a field used to indicate a start time point and a field used to indicate duration.

The field used to indicate the start time point and the field used to indicate the duration may be used to carry a scheduling time of the first network device. The scheduling time of the first network device may include a time in a DTI of the first network device. For example, the scheduling time of the first network device may include a part or all of the time in the DTI of the first network device. If the scheduling time of the first network device includes the part of the time in the DTI of the first network device, the scheduling time of the first network device may include a preset SP or CBAP in the DTI of the first network device.

The first frame may be a beacon frame, an announcement frame, a management frame, or another control frame in a beacon transmission slot (Beacon Transmission Interval, BTI) of the first network device.

S802. A second network device listens to the first frame sent by the first network device.

The second network device may obtain, through listening, the first frame sent by the first network device, then obtain the start time point and the duration that are included in the first frame, and learn of the scheduling time of the first network device based on the start time point and the duration that are included in the first frame.

S803. The second network device sends a second frame based on the first frame, where the second frame includes a field used to indicate a start time point and a field used to indicate duration.

The field used to indicate the start time point and the field used to indicate the duration that are in the second frame may be used to carry a scheduling time of the second network device.

In this embodiment, the scheduling time of the second network device may be determined by the second network device based on the scheduling time of the first network device, namely, the start time point and the duration that are in the first frame. If the scheduling time of the second network device may include a part of a time in a DTI of the second network device, the scheduling time of the second network device may include a preset SP or CBAP in the DTI of the second network device.

In an implementation, the second network device may determine, based on the scheduling time of the first network device and an idle time of the second network device, the scheduling time of the second network device from a time at which the scheduling time of the first network device overlaps the idle time of the second network device. For example, the idle time of the second network device may include the time in the DTI of the second network device. For example, the idle time of the second network device may include a part or all of the time in the DTI of the second network device.

In another implementation, the second network device may set the scheduling time of the first network device to the scheduling time of the second network device, to start to exchange information with the first network device at the beginning of the scheduling time of the second network device. In this implementation, for example, the second network device may set the DTI of the second network device to a CBAP only.

The second network device may send the second frame in a broadcast or multicast manner, or may directionally send the second frame.

For example, the second frame may be a beacon frame, an announcement frame, a management frame, or another control frame of the second network device.

S804. The first network device listens to the second frame sent by the second network device.

According to the information transmission method provided in this embodiment, the second network device can listen to the first frame that is sent by the first network device and that includes the field used to indicate the start time point and the field used to indicate the duration, and send, based on the first frame, the second frame that includes the field used to indicate the start time point and the field used to indicate the duration, so that mutual scheduling between the first network device and the second network device is implemented.

If the scheduling between the first network device and the second network device shown in FIG. 8 is used for communication between network devices, that the second network device transmits information with the first network device in S103 in the foregoing method may include the following.

The second network device may transmit the information with the first network device in the scheduling time of the second network device.

Correspondingly, the frame sent by the second network device to the first network device and the frame sent by the first network device to the second network device each may be a frame transmitted in the scheduling time of the second network device.

In the implementation provided in the foregoing embodiment, the first network device may trigger the second network device to allocate a scheduling time, namely, the foregoing scheduling time of the second network device, so that the first network device and the second network device can exchange information in the scheduling time of the second network device, to avoid time asynchronization between different network devices and ensure information transmission. In addition, information interference is avoided because the allocated scheduling time is dedicated to information exchange between the network devices.

Figure 9:
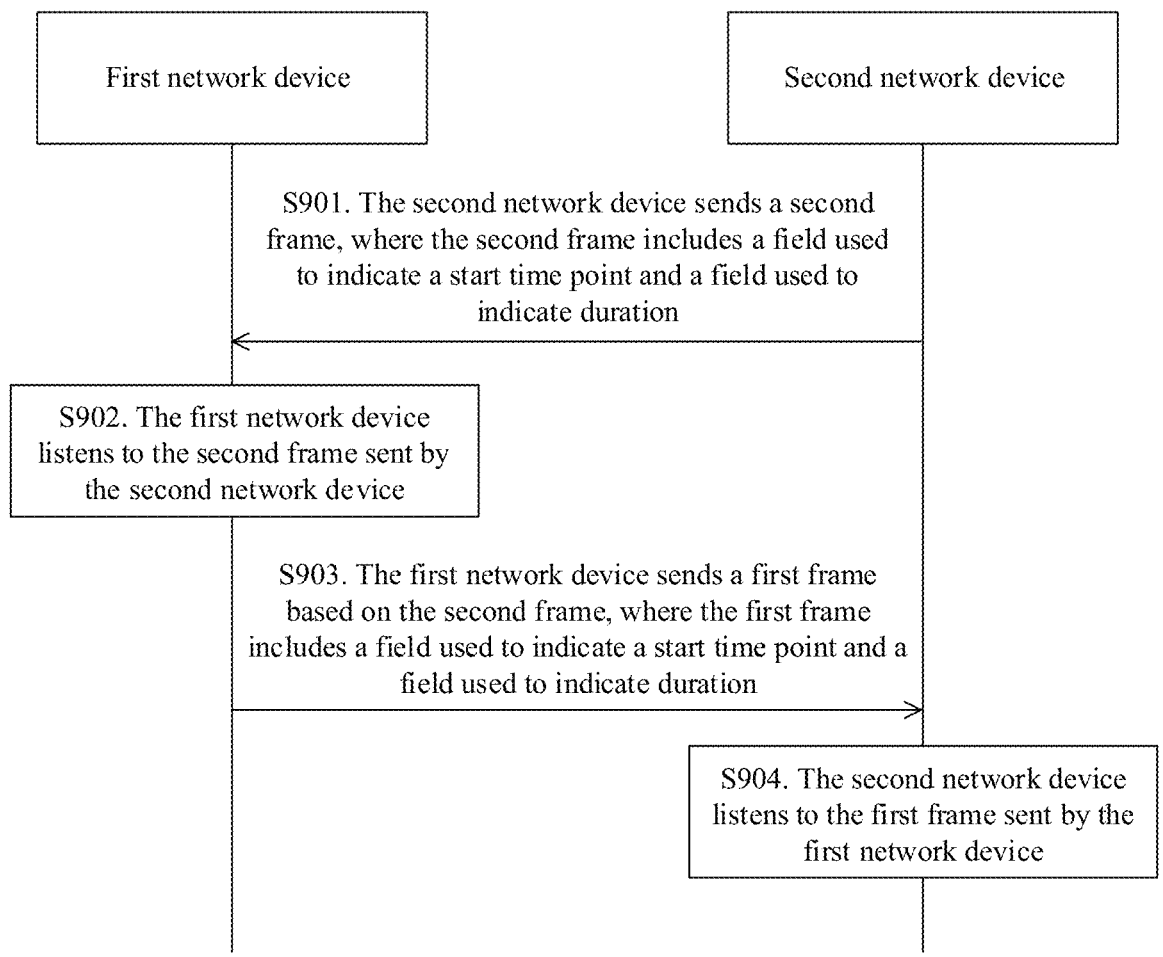
FIG. 9 is a flowchart of a method in which a second network device initiates scheduling in an information transmission method in this application.

In another implementation, scheduling between network devices may alternatively be initiated by the second network device. FIG. 9 is a flowchart of a method in which a second network device initiates scheduling in an information transmission method in this application. The method may further include the following steps.

S901. The second network device sends a second frame, where the second frame includes a field used to indicate a start time point and a field used to indicate duration.

The field used to indicate the start time point and the field used to indicate the duration may be used to carry a scheduling time of the second network device. The scheduling time of the second network device may include a time in a DTI of the second network device. For example, the scheduling time of the second network device may include a part or all of the time in the DTI of the second network device. If the scheduling time of the second network device includes the part of the time in the DTI of the second network device, the scheduling time of the second network device may include a preset SP or CBAP in the DTI of the second network device.

The second frame may be a beacon frame, an announcement frame, a management frame, or another control frame in a BTI of the second network device.

S902. A first network device listens to the second frame sent by the second network device.

The first network device may obtain, through listening, the second frame sent by the second network device, then obtain the start time point and the duration that are included in the second frame, and learn of the scheduling time of the second network device based on the start time point and the duration that are included in the second frame.

S903. The first network device sends a first frame based on the second frame, where the first frame includes a field used to indicate a start time point and a field used to indicate duration.

The field used to indicate the start time point and the field used to indicate the duration that are in the first frame may be used to carry a scheduling time of the first network device.

In this embodiment, the scheduling time of the first network device may be determined by the first network device based on the scheduling time of the second network device, namely, the start time point and the duration that are in the second frame. If the scheduling time of the first network device may include a part of a time in a DTI of the first network device, the scheduling time of the first network device may include a preset SP or CBAP in the DTI of the first network device.

In an implementation, the first network device may determine, based on the scheduling time of the second network device and an idle time of the first network device, the scheduling time of the first network device from a time at which the scheduling time of the second network device overlaps the idle time of the first network device. For example, the idle time of the first network device may include the time in the DTI of the first network device. For example, the idle time of the first network device may include a part or all of the time in the DTI of the first network device.

In another implementation, the first network device may set the scheduling time of the second network device to the scheduling time of the first network device, to start to exchange information with the second network device at the beginning of the scheduling time of the first network device. In this implementation, for example, the first network device may set the DTI of the first network device to a CBAP only.

The first network device may send the first frame in a broadcast or multicast manner, or may directionally send the first frame. For example, the first frame may be a beacon frame, an announcement frame, a management frame, or another control frame of the first network device.

S904. The second network device listens to the first frame sent by the first network device.

According to the information transmission method provided in this embodiment, the first network device can listen to the second frame that is sent by the second network device and that includes the field used to indicate the start time point and the field used to indicate the duration, and send, based on the second frame, the first frame that includes the field used to indicate the start time point and the field used to indicate the duration, so that mutual scheduling between the first network device and the second network device is implemented.

If the scheduling between the first network device and the second network device shown in FIG. 9 is used for communication between network devices, that the second network device transmits information with the first network device in S103 in the foregoing method may include the following.

The second network device may transmit the information with the first network device in the scheduling time of the first network device.

Correspondingly, the frame sent by the second network device to the first network device and the frame sent by the first network device to the second network device each may be a frame transmitted in the scheduling time of the first network device.

In the implementation provided in the foregoing embodiment, the second network device may trigger the first network device to allocate a scheduling time, namely, the foregoing scheduling time of the first network device, so that the first network device and the second network device can exchange information in the scheduling time of the first network device, to avoid time asynchronization between different network devices and ensure information transmission. In addition, information interference is avoided because the allocated scheduling time is dedicated to information exchange between the network devices.

Figure 10:
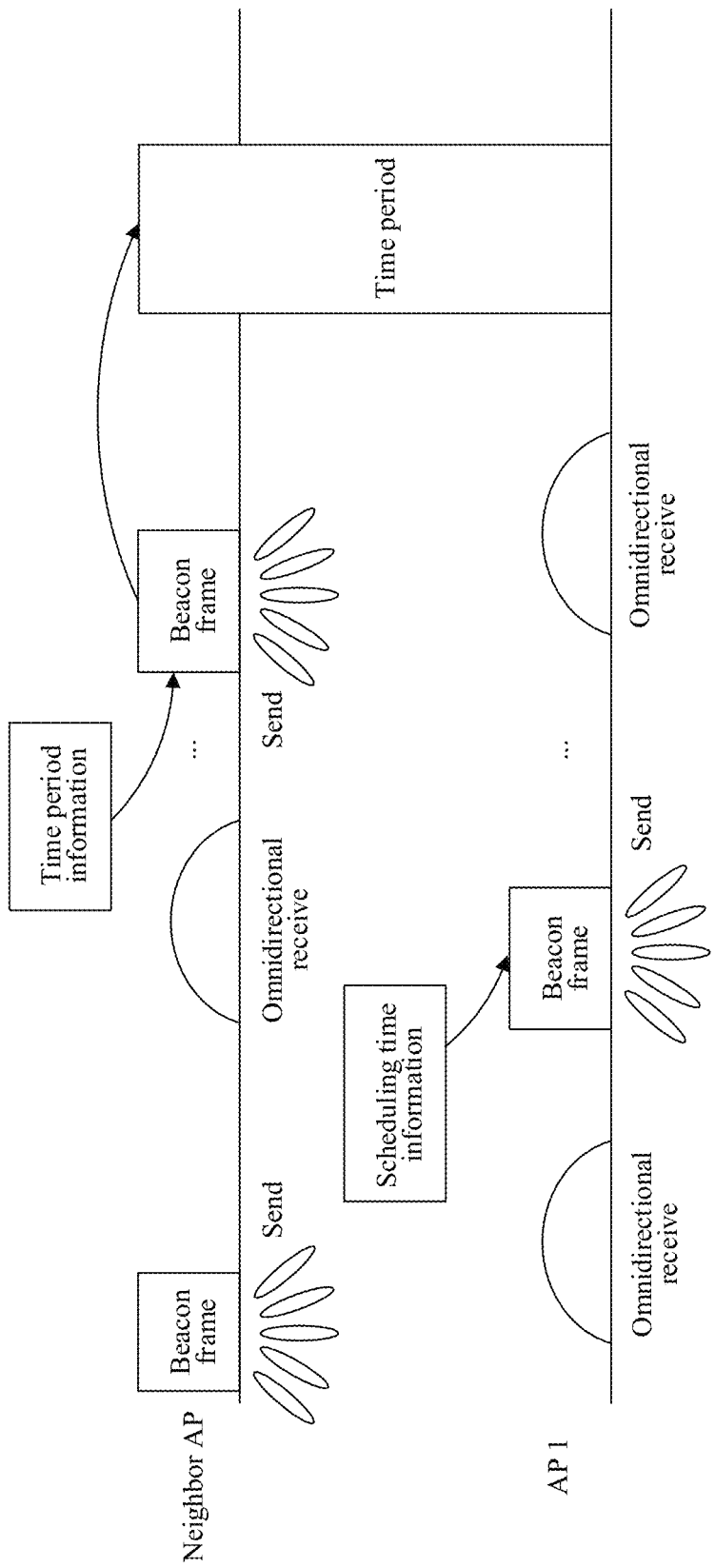
FIG. 10 is a flowchart 2 of signaling interaction between APs in an information transmission method in this application.

The foregoing implementations are described below in an instance by using an example in which a neighbor AP serves as the first network device and an AP 1 serves as the second network device. FIG. 10 is a flowchart 2 of signaling interaction between APs in an information transmission method in this application. As shown in FIG. 10, the neighbor AP may serve as the first network device, and send beacon frames in a plurality of sending directions in a first BTI of the neighbor AP, and the AP 1 serves as the second network device, and obtains, through listening by using an omnidirectional receive antenna, the beacon frame sent by the neighbor AP. If the AP 1 may determine, based on capability indication information in the beacon frame, that both the neighbor AP and the AP 1 support inter-AP training or communication, the AP 1 may send beacon frames in a plurality of sending directions in a BTI of the AP 1. The beacon frame includes second allocation information used to indicate that the AP 1 supports coordination between APs, and a field used to indicate a start time point and a field used to indicate duration. The neighbor AP obtains, through listening by using an omnidirectional receive antenna, the beacon frame sent by the AP 1, learns of the field used to indicate the start time point and the field used to indicate the duration, learns that a scheduling time of the AP 1 is used for communication between the APs, and then determines a scheduling time of the neighbor AP based on the scheduling time of the AP 1 and an idle time of the neighbor AP. After determining the scheduling time of the neighbor AP, the neighbor AP may send beacon frames in a plurality of sending directions in a second BTI of the neighbor AP. The beacon frame may include first allocation information used to indicate that the neighbor AP supports the coordination between the APs, and a field used to indicate a start time point and a field used to indicate duration. The AP 1 obtains, through listening by using an omnidirectional receive antenna, the beacon frame sent by the neighbor AP, learns of the field used to indicate the start time point and the field used to indicate the duration, and then learns that the scheduling time of the neighbor AP is used for the communication between the APs. The scheduling time of the neighbor AP is a scheduling time determined by the neighbor AP and the AP 1 through negotiation. After learning that the scheduling time of the neighbor AP is used for the communication between the APs, the AP 1 may transmit information with the neighbor AP in the scheduling time of the neighbor AP.

The foregoing information transmission methods are applicable to a co-channel BSS, for example, a co-channel DMG BSS, to improve spatial multiplexing and reduce mutual interference. In a co-channel BSS scenario, a network device may be a network device cluster, for example, a personal basic service set control point cluster (PCP/AP Clustering).

An establisher of the network device cluster, also referred to as a synchronization access point (S-AP), may serve as a first network device and send a first frame. The first frame may carry a cluster parameter and cluster control information. For example, the first frame may be a beacon frame. To implement beamforming training between network devices in the network device cluster, the cluster control information may be used to indicate whether beamforming training needs to be performed between network devices in a cluster in which the first network device is located.

The beacon frame is used as an example. The cluster control information may be located in a preset bit in a cluster control field in the beacon frame. In an instance, a structure of the cluster control field may be shown in FIG. 11. FIG. 11 is a schematic structural diagram 1 of a cluster control field in a beacon frame in an information transmission method in this application. As shown in FIG. 11, if a value of a discovery mode field in the beacon frame is a bit value 0, the cluster control field may include an 8-bit beacon service period duration (Beacon SP Duration) field, a 48-bit cluster identifier (Clustering ID) field, a 2-bit cluster member role (Clustering Member Role) field, a 5-bit cluster maximum member (ClusteringMaxMem) field, and a 1-bit inter-PCP/AP beamforming training field.

The inter-PCP/AP beamforming training field may be located in a reserved bit in a cluster control field in an existing beacon frame. If the value of the discovery mode field in the beacon frame is the bit value 0, the cluster control information may be located in the inter-PCP/AP beamforming training field in the cluster control field in the beacon frame shown in FIG. 11, namely, B63 shown in FIG. 11.

For example, if B63 has a bit value 1, a device that obtains the beacon frame through listening, for example, the second network device or another network device, may determine that beamforming training needs to be performed between the network devices in a cluster in which the first network device is located. On the contrary, if B63 has a bit value 0, a device that obtains the beacon frame through listening, for example, the second network device or another network device, may determine that beamforming training does not need to be performed between the network devices in a cluster in which the first network device is located.

In another instance, a structure of the cluster control field may be shown in FIG. 12. FIG. 12 is a schematic structural diagram 2 of a cluster control field in a beacon frame in an information transmission method in this application. As shown in FIG. 12, if a value of a discovery mode field in the beacon frame is a bit value 1, the cluster control field may include a 48-bit association beamforming training responder address (A-BFT Responder Address) field, a 1-bit inter-PCP/AP beamforming training field, and a 15-bit reserved bit.

The inter-PCP/AP beamforming training field may be located in a reserved bit in a cluster control field in an existing beacon frame. If the value of the discovery mode field in the beacon frame is the bit value 1, the cluster control information may be located in the inter-PCP/AP beamforming training field in the cluster control field in the beacon frame shown in FIG. 12, namely, B48 shown in FIG. 12.

For example, if B48 has a bit value 1, a device that obtains the beacon frame through listening, for example, the second network device or another network device, may determine that beamforming training needs to be performed between the network devices in a cluster in which the first network device is located. Alternatively, if B48 has a bit value 0, a device that obtains the beacon frame through listening, for example, the second network device or another network device, may determine that beamforming training does not need to be performed between the network devices in a cluster in which the first network device is located.

Figure 13:
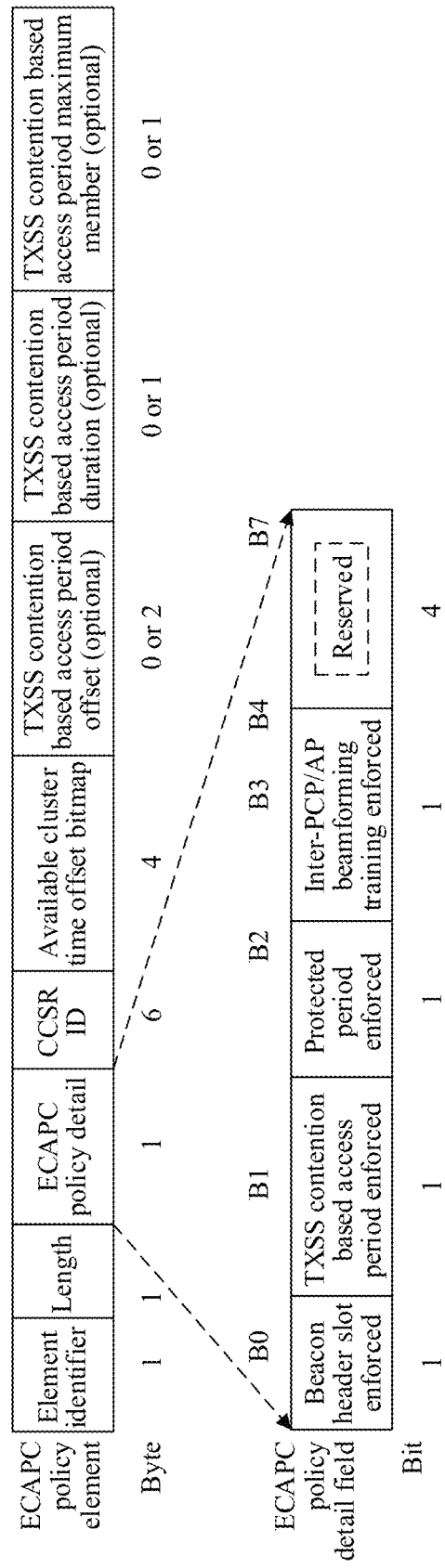
FIG. 13 is a schematic structural diagram of an ECAPC policy detail field in an ECAPC policy element in a beacon frame in an information transmission method in this application.

In still another instance, the cluster control information may alternatively be located in a reserved bit in an ECAPC policy detail field (ECAPC Policy Detail Field) in an ECAPC policy element (ECAPC Policy Element) in the beacon frame. FIG. 13 is a schematic structural diagram of an ECAPC policy detail field in an ECAPC policy element in a beacon frame in an information transmission method in this application. As shown in FIG. 13, the ECAPC policy element may include a 1-byte element identifier (Element ID) field, a 1-byte length field, a 1-byte ECAPC policy detail field, a 6-byte centralized coordination service root identifier (CCSR ID) field, a 4-byte available cluster time offset bitmap field, a 0-byte or 2-byte TXSS contention based access period offset (TXSS CBAP Offset) field, a 0-byte or 1-byte TXSS contention based access period duration (TXSS CBAP Duration) field, and a 0-byte or 1-byte TXSS contention based access period maximum member (TXSS CBAP MaxMem) field.

The TXSS contention based access period offset field, the TXSS contention based access period duration field, and the TXSS contention based access period maximum member field may be optional fields in the ECAPC policy element.

The ECAPC policy detail field may include a 1-bit beacon header slot enforced (BHI Enforced) field, a 1-bit TXSS contention based access period enforced (TXSS CBAP Enforced) field, a 1-bit protected period enforced field, a 1-bit inter-PCP/AP beamforming training enforced field, and a 4-bit reserved field.

The inter-PCP/AP beamforming training enforced field may be located in a reserved bit in an ECAPC policy detail field in an ECAPC policy element in an existing beacon frame. The cluster control information may be located in the inter-PCP/AP beamforming training enforced field in the ECAPC policy detail field in the ECAPC policy element in the beacon frame shown in FIG. 13, namely, B3 shown in FIG. 13.

For example, if B3 has a bit value 1, a device that obtains the beacon frame through listening, for example, the second network device or another network device, may determine that beamforming training needs to be performed between network devices in a cluster in which the first network device is located. Alternatively, if B3 has a bit value 0, a device that obtains the beacon frame through listening, for example, the second network device or another network device, may determine that beamforming training does not need to be performed between network devices in a cluster in which the first network device is located.

Figure 14:
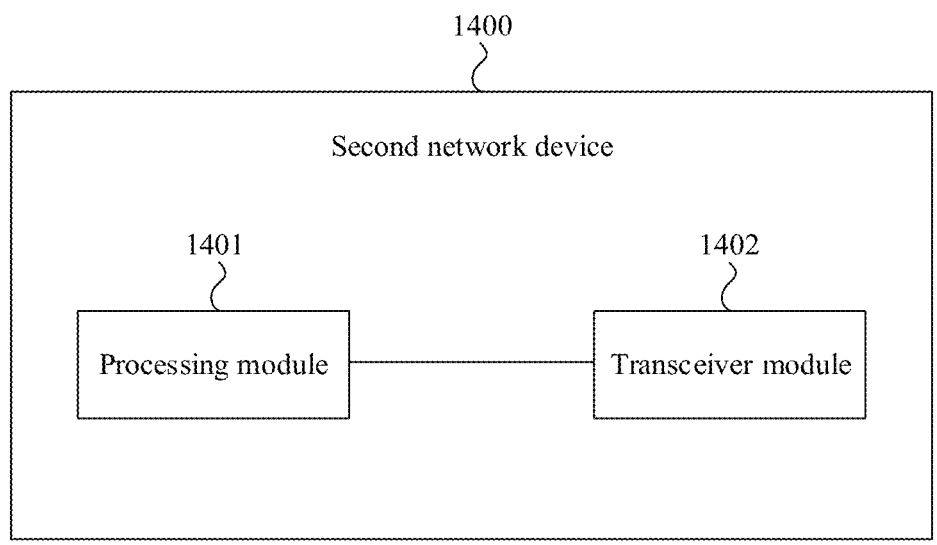
FIG. 14 is a schematic structural diagram 1 of a second network device according to an embodiment of this application.

An embodiment of this application may further provide a second network device. The second network device may perform any information transmission method performed by the second network device. FIG. 14 is a schematic structural diagram 1 of a second network device according to an embodiment of this application. As shown in FIG. 14, the second network device 1400 may include a processing module 1401, configured to control to listen to a first frame sent by a first network device, and if both the first network device and the second network device support communication between network devices, further control to transmit information with the first network device, where the first frame is used to indicate whether the first network device supports the communication between the network devices, and a transceiver module 1402, configured to listen to the first frame sent by the first network device, and transmit the information with the first network device.

Optionally, that the first frame may be used to indicate whether the first network device supports the communication between the network devices includes the first frame includes a bit used to indicate whether the first network device supports the communication between the network devices.

Alternatively, that the first frame is used to indicate whether the first network device supports the communication between the network devices includes the first frame is used for implicit indication by using a frame type.

Optionally, that the first frame is used to indicate whether the first network device supports the communication between the network devices includes the first frame includes first allocation information used to indicate whether the first network device supports the communication between the network devices.

Optionally, the first allocation information includes a field used to indicate the communication between the network devices, and/or a field used to indicate a source network device identifier and a field used to indicate a target network device identifier.

Optionally, the field indicating the communication between the network devices includes at least one of the following locations in the first frame: a reserved bit in an allocation control field in an allocation field in an extended schedule element, an allocation type field in the allocation control field in the allocation field in the extended schedule element, a source association identifier field and a destination association identifier field that are in the allocation field in the extended schedule element, a reserved bit in a channel allocation field in an EDMG extended schedule element, a reserved bit in an allocation key field in the channel allocation field in the EDMG extended schedule element, and a source association identifier field and a destination association identifier field that are in the allocation key field in the channel allocation field in the EDMG extended schedule element.

Optionally, the field indicating the source network device identifier and the field indicating the target network device identifier include at least one of the following locations in the first frame: a source association identifier field and a destination association identifier field that are in an allocation field in an extended schedule element, fields in an information element other than the extended schedule element in the first frame, a source association identifier field and a destination association identifier field that are in an allocation key field in a channel allocation field in an EDMG extended schedule element, and fields in an information element other than the EDMG extended schedule element in the first frame.

Optionally, the field indicating the communication between the network devices includes an allocation type field in an allocation control field in an allocation field in an extended schedule element in the first frame, and the field indicating the source network device identifier and the field indicating the target network device identifier are a source association identifier field and a destination association identifier field that are in the allocation field in the extended schedule element in the first frame.

Alternatively, the field indicating the communication between the network devices includes an allocation type field in an allocation control field in an allocation field in an extended schedule element in the first frame, and a source association identifier field and a destination association identifier field that are in the allocation field, and the field indicating the source network device identifier and the field indicating the target network device identifier are fields in an information element other than the extended schedule element in the first frame.

Alternatively, the field indicating the communication between the network devices includes an allocation type field in an allocation control field in an allocation field in an extended schedule element in the first frame, and the field indicating the source network device identifier and the field indicating the target network device identifier are fields in an information element other than the extended schedule element in the first frame.

Alternatively, the field indicating the communication between the network devices includes a source association identifier field and a destination association identifier field that are in an allocation field in an extended schedule element in the first frame, and the field indicating the source network device identifier and the field indicating the target network device identifier are fields in an information element other than the extended schedule element in the first frame.

Alternatively, the field indicating the source network device identifier and the field indicating the target network device identifier are a source association identifier field and a destination association identifier field that are in an allocation field in an extended schedule element in the first frame.

Optionally, the first frame further includes a field used to indicate a start time point and a field used to indicate duration.

Optionally, the processing module 1401 is further configured to control to send a second frame to the first network device, where the second frame indicates whether the second network device supports the communication between the network devices, and the transceiver module 1402 is configured to send the second frame to the first network device.

Optionally, that the second frame is used to indicate whether the second network device supports the communication between the network devices includes: the second frame includes a bit used to indicate whether the second network device supports the communication between the network devices.

Alternatively, that the second frame is used to indicate whether the second network device supports the communication between the network devices includes: the second frame is used for implicit indication by using a frame type.

Optionally, that the second frame is used to indicate whether the first network device supports the communication between the network devices includes: the second frame includes second allocation information used to indicate whether the second network device supports the communication between the network devices.

Optionally, the second allocation information includes a field used to indicate the communication between the network devices, and/or a field used to indicate a source network device identifier and a field used to indicate a target network device identifier.

Optionally, the field indicating the communication between the network devices includes at least one of the following locations in the second frame: a reserved bit in an allocation control field in an allocation field in an extended schedule element, an allocation type field in the allocation control field in the allocation field in the extended schedule element, a source association identifier field and a destination association identifier field that are in the allocation field in the extended schedule element, a reserved bit in a channel allocation field in an EDMG extended schedule element, a reserved bit in an allocation key field in the channel allocation field in the EDMG extended schedule element, and a source association identifier field and a destination association identifier field that are in the allocation key field in the channel allocation field in the EDMG extended schedule element.

Optionally, the field indicating the source network device identifier and the field indicating the target network device identifier include at least one of the following locations in the second frame: a source association identifier field and a destination association identifier field that are in an allocation field in an extended schedule element, fields in an information element other than the extended schedule element in the second frame, a source association identifier field and a destination association identifier field that are in an allocation key field in a channel allocation field in an EDMG extended schedule element, and fields in an information element other than the EDMG extended schedule element in the second frame.

Optionally, the field indicating the communication between the network devices includes an allocation type field in an allocation control field in an allocation field in an extended schedule element in the second frame, and the field indicating the source network device identifier and the field indicating the target network device identifier are a source association identifier field and a destination association identifier field that are in the allocation field in the extended schedule element in the second frame.

Alternatively, the field indicating the communication between the network devices includes an allocation type field in an allocation control field in an allocation field in an extended schedule element in the second frame, and a source association identifier field and a destination association identifier field that are in the allocation field, and the field indicating the source network device identifier and the field indicating the target network device identifier are fields in an information element other than the extended schedule element in the second frame.

Alternatively, the field indicating the communication between the network devices includes an allocation type field in an allocation control field in an allocation field in an extended schedule element in the second frame, and the field indicating the source network device identifier and the field indicating the target network device identifier are fields in an information element other than the extended schedule element in the second frame.

Alternatively, the field indicating the communication between the network devices includes a source association identifier field and a destination association identifier field that are in an allocation field in an extended schedule element in the second frame, and the field indicating the source network device identifier and the field indicating the target network device identifier are fields in an information element other than the extended schedule element in the second frame.

Alternatively, the field indicating the source network device identifier and the field indicating the target network device identifier are a source association identifier field and a destination association identifier field that are in an allocation field in an extended schedule element in the second frame.

Optionally, the second frame further includes a field used to indicate a start time point and a field used to indicate duration.

Optionally, the processing module 1401 is configured to in an A-BFT period, control to send a sweep frame to the first network device, and control to receive a sweep feedback frame sent by the first network device, and the transceiver module 1402 is configured to send the sweep frame to the first network device, and receive the sweep feedback frame sent by the first network device.

Alternatively, the processing module 1401 is configured to in an ATI, control to receive a request frame sent by the first network device, and control to send a response frame to the first network device, and the transceiver module 1402 is configured to receive the request frame sent by the first network device, and send the response frame to the first network device.

Alternatively, the processing module 1401 is configured to in a preset time period in a DTI, control to send a data frame, a control frame, or a management frame to the first network device, and control to receive a data frame, a control frame, or a management frame sent by the first network device, and the transceiver module 1402 is configured to send the data frame, the control frame, or the management frame to the first network device, and receive the data frame, the control frame, or the management frame sent by the first network device.

Figure 15:
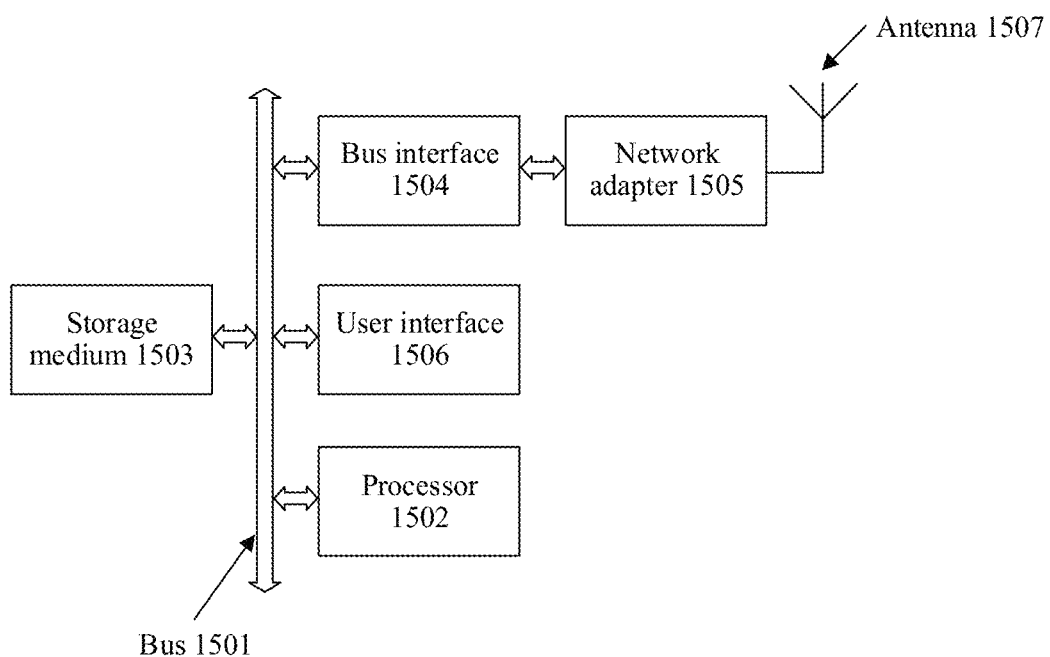
FIG. 15 is a schematic structural diagram 2 of a second network device according to an embodiment of this application.

The following describes a specific product form in FIG. 14 with reference to FIG. 15. FIG. 15 is a schematic structural diagram 2 of a second network device according to an embodiment of this application. The second network device in FIG. 14 may be implemented in a plurality of product forms.

For example, in a possible product form, the second network device may be implemented by using a bus 1501 as a general bus architecture. As shown in FIG. 15, the bus 1501 may include any quantity of interconnect buses and bridges based on a specific application and an overall design constraint of the second network device. The bus 1501 connects various circuits together. These circuits include a processor 1502, a storage medium 1503, a bus interface 1504, and a user interface 1506.

The second network device uses the bus interface 1504 to connect a network adapter 1505 and the like by using the bus 1501. The network adapter 1505 may be configured to implement a signal processing function at a physical layer in a wireless local area network, and send and receive a radio frequency signal by using an antenna 1507. In this application, the antenna 1507 is configured to implement information receiving and sending performed by the second network device in the foregoing method embodiments.

The user interface 1506 may be connected to a user terminal such as a keyboard, a display, a mouse, or a joystick. The bus 1501 may be further connected to various other circuits such as a timing source, a peripheral device, a voltage regulator, and a power management circuit. These circuits are well-known in the art, and therefore are not described in detail.

The processor 1502 is responsible for bus management and general processing (including executing software stored in the storage medium 1503). The processor 1502 may be implemented by using one or more general purpose processors and/or dedicated processors. For example, the processor includes a microprocessor, a microcontroller, a DSP processor, and another circuit that can execute software. The software should be broadly construed as representation of an instruction, data, or any combination thereof, regardless of whether the software is referred to as software, firmware, middleware, microcode, a hardware description language, or the like. In this application, the processor 1502 is configured to implement all processing except information receiving and sending performed by the second network device in the foregoing method embodiments.

In addition, in FIG. 15, the storage medium 1503 is separated from the processor 1502. However, a person skilled in the art easily understands that the storage medium 1503 or any part of the storage medium 1503 may be located outside the second network device. For example, the storage medium 1503 may include a transmission line, a carrier waveform modulated by using data, and/or a computer product separated from a wireless node. These media may be accessed by the processor 1502 by using the bus interface 1504. Alternatively, the storage medium 1503 or any part of the storage medium 1503 may be integrated into the processor 1502. For example, the storage medium 1503 may be a cache and/or a general-purpose register. In this application, the storage medium 1803 is configured to store a computer program, and the computer program is executed by the processor 1502, to implement all processing performed by the processor 1502.

Alternatively, in another possible product form, the second network device may be configured as a general-purpose processing system, for example, collectively referred to as a chip. The general-purpose processing system includes one or more microprocessors providing a processor function, and an external memory providing at least a part of the storage medium 1503. All of these are connected to another support circuit by using an external bus architecture.

Alternatively, in another possible product form, the second network device may be implemented by using the following: an application-specific integrated circuit (ASIC) having the processor 1502, the bus interface 1504, and the user interface 1506, and at least a part of the storage medium 1503 integrated into a single chip.

Alternatively, in another possible product form, the second network device may be implemented by using the following: one or more field-programmable gate arrays (FPGA), a programmable logic device (PLD), a controller, a state machine, gate logic, a discrete hardware component, any other suitable circuit, or any combination of circuits that can perform various functions described in this application.

It should be understood that the second network device in FIG. 14 and FIG. 15 has any function of the second network device in the foregoing method embodiments. Details are not described herein again.

Optionally, an embodiment of this application further provides a computer readable storage medium. The computer readable storage medium may include an instruction. When the instruction is run on a computer, the computer is enabled to perform the information transmission method performed by the second network device shown in any one of the foregoing embodiments.

Optionally, an embodiment of this application further provides a computer program product including an instruction. When the computer program product is run on a computer, the computer is enabled to perform the information transmission method performed by the second network device shown in any one of the foregoing embodiments.

Functions of the computer program product may be implemented by using hardware or software. When the functions are implemented by using software, the functions may be stored in a computer readable medium or transmitted as one or more instructions or code in the computer readable storage medium.

The second network device, the computer readable storage medium, and the computer program product in the embodiments of this application may perform the information transmission method performed by the second network device shown in any one of the foregoing descriptions. For specific implementation processes and beneficial effects thereof, refer to the foregoing descriptions. Details are not described herein again.

Figure 16:
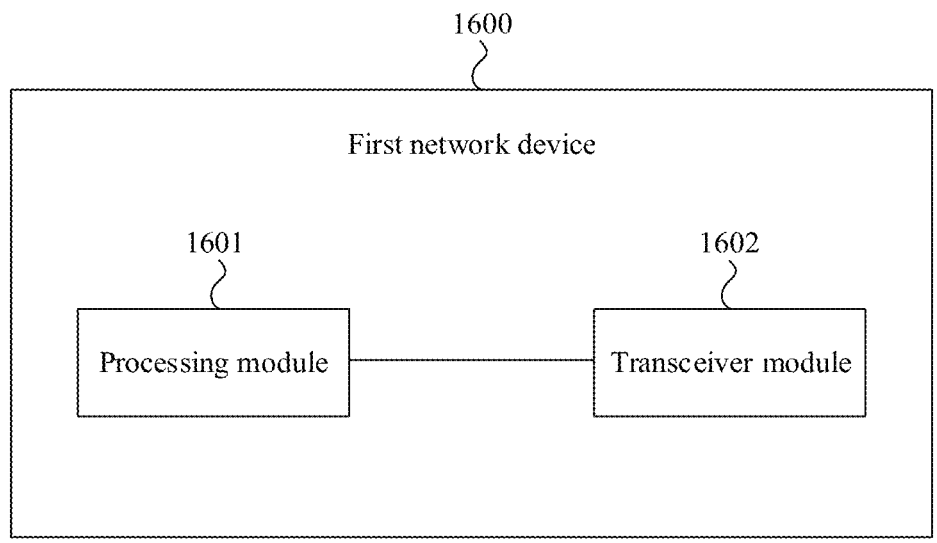
FIG. 16 is a schematic structural diagram 1 of a first network device according to an embodiment of this application.

An embodiment of this application may further provide a first network device. The first network device may perform any information transmission method performed by the first network device. FIG. 16 is a schematic structural diagram 1 of a first network device according to an embodiment of this application. As shown in FIG. 16, the first network device 1600 may include a processing module 1601, configured to control to send a first frame, and if both the first network device and a second network device support communication between network devices, further control to transmit information with the second network device, where the first frame is used to indicate whether the first network device supports the communication between the network devices, and a transceiver module 1602, configured to send the first frame, and transmit the information with the second network device.

In a possible implementation, that the first frame is used to indicate whether the first network device supports the communication between the network devices includes the first frame includes a bit used to indicate whether the first network device supports the communication between the network devices.

Alternatively, that the first frame is used to indicate whether the first network device supports the communication between the network devices includes the first frame is used for implicit indication by using a frame type.

In another possible implementation, that the first frame is used to indicate whether the first network device supports the communication between the network devices includes the first frame includes first allocation information used to indicate whether the first network device supports the communication between the network devices.

In still another possible implementation, the first allocation information includes a field used to indicate the communication between the network devices, and/or a field used to indicate a source network device identifier and a field used to indicate a target network device identifier.

In yet another possible implementation, the field indicating the communication between the network devices includes at least one of the following locations in the first frame: a reserved bit in an allocation control field in an allocation field in an extended schedule element, an allocation type field in the allocation control field in the allocation field in the extended schedule element, a source association identifier field and a destination association identifier field that are in the allocation field in the extended schedule element, a reserved bit in a channel allocation field in an EDMG extended schedule element, a reserved bit in an allocation key field in the channel allocation field in the EDMG extended schedule element, and a source association identifier field and a destination association identifier field that are in the allocation key field in the channel allocation field in the EDMG extended schedule element.

In yet another possible implementation, the field indicating the source network device identifier and the field indicating the target network device identifier include at least one of the following locations in the first frame: a source association identifier field and a destination association identifier field that are in an allocation field in an extended schedule element, fields in an information element other than the extended schedule element in the first frame, a source association identifier field and a destination association identifier field that are in an allocation key field in a channel allocation field in an EDMG extended schedule element, and fields in an information element other than the EDMG extended schedule element in the first frame.

In yet another possible implementation, the field indicating the communication between the network devices includes an allocation type field in an allocation control field in an allocation field in an extended schedule element in the first frame, and the field indicating the source network device identifier and the field indicating the target network device identifier are a source association identifier field and a destination association identifier field that are in the allocation field in the extended schedule element in the first frame.

Alternatively, the field indicating the communication between the network devices includes an allocation type field in an allocation control field in an allocation field in an extended schedule element in the first frame, and a source association identifier field and a destination association identifier field that are in the allocation field, and the field indicating the source network device identifier and the field indicating the target network device identifier are fields in an information element other than the extended schedule element in the first frame.

Alternatively, the field indicating the communication between the network devices includes an allocation type field in an allocation control field in an allocation field in an extended schedule element in the first frame, and the field indicating the source network device identifier and the field indicating the target network device identifier are fields in an information element other than the extended schedule element in the first frame.

Alternatively, the field indicating the communication between the network devices includes a source association identifier field and a destination association identifier field that are in an allocation field in an extended schedule element in the first frame, and the field indicating the source network device identifier and the field indicating the target network device identifier are fields in an information element other than the extended schedule element in the first frame.

Alternatively, the field indicating the source network device identifier and the field indicating the target network device identifier are a source association identifier field and a destination association identifier field that are in an allocation field in an extended schedule element in the first frame.

In yet another possible implementation, the first frame further includes a field used to indicate a start time point and a field used to indicate duration.

In yet another possible implementation, the processing module 1601 is further configured to before controlling to transmit the information with the second network device, control to receive a second frame sent by the second network device, where the second frame indicates whether the second network device supports the communication between the network devices, and the transceiver module 1602 is further configured to receive the second frame sent by the second network device.

In yet another possible implementation, that the second frame is used to indicate whether the second network device supports the communication between the network devices includes the second frame includes a bit used to indicate whether the second network device supports the communication between the network devices.

Alternatively, that the second frame is used to indicate whether the second network device supports the communication between the network devices includes the second frame is used for implicit indication by using a frame type.

In yet another possible implementation, that the second frame is used to indicate whether the second network device supports the communication between the network devices includes the second frame includes second allocation information used to indicate whether the second network device supports the communication between the network devices.

In yet another possible implementation, the second allocation information includes a field used to indicate the communication between the network devices, and/or a field used to indicate a source network device identifier and a field used to indicate a target network device identifier.

In yet another possible implementation, the field indicating the communication between the network devices includes at least one of the following locations in the second frame: a reserved bit in an allocation control field in an allocation field in an extended schedule element, an allocation type field in the allocation control field in the allocation field in the extended schedule element, a source association identifier field and a destination association identifier field that are in the allocation field in the extended schedule element, a reserved bit in a channel allocation field in an EDMG extended schedule element, a reserved bit in an allocation key field in the channel allocation field in the EDMG extended schedule element, and a source association identifier field and a destination association identifier field that are in the allocation key field in the channel allocation field in the EDMG extended schedule element.

In yet another possible implementation, the field indicating the source network device identifier and the field indicating the target network device identifier include at least one of the following locations in the second frame: a source association identifier field and a destination association identifier field that are in an allocation field in an extended schedule element, fields in an information element other than the extended schedule element in the second frame, a source association identifier field and a destination association identifier field that are in an allocation key field in a channel allocation field in an EDMG extended schedule element, and fields in an information element other than the EDMG extended schedule element in the second frame.

In yet another possible implementation, the field indicating the communication between the network devices includes an allocation type field in an allocation control field in an allocation field in an extended schedule element in the second frame, and the field indicating the source network device identifier and the field indicating the target network device identifier are a source association identifier field and a destination association identifier field that are in the allocation field in the extended schedule element in the second frame.

Alternatively, the field indicating the communication between the network devices includes an allocation type field in an allocation control field in an allocation field in an extended schedule element in the second frame, and a source association identifier field and a destination association identifier field that are in the allocation field, and the field indicating the source network device identifier and the field indicating the target network device identifier are fields in an information element other than the extended schedule element in the second frame.

Alternatively, the field indicating the communication between the network devices includes an allocation type field in an allocation control field in an allocation field in an extended schedule element in the second frame, and the field indicating the source network device identifier and the field indicating the target network device identifier are fields in an information element other than the extended schedule element in the second frame.

Alternatively, the field indicating the communication between the network devices includes a source association identifier field and a destination association identifier field that are in an allocation field in an extended schedule element in the second frame, and the field indicating the source network device identifier and the field indicating the target network device identifier are fields in an information element other than the extended schedule element in the second frame.

Alternatively, the field indicating the source network device identifier and the field indicating the target network device identifier are a source association identifier field and a destination association identifier field that are in an allocation field in an extended schedule element in the second frame.

In yet another possible implementation, the second frame may further include a field used to indicate a start time point and a field used to indicate duration.

In yet another possible implementation, the processing module 1601 is configured to in an A-BF period, control to receive a sweep frame sent by the second network device, and control to send a sweep feedback frame to the second network device, and the transceiver module 1602 is configured to receive the sweep frame sent by the second network device, and send the sweep feedback frame to the second network device.

Alternatively, the processing module 1601 is configured to in an ATI, control to send a request frame to the second network device, and control to receive a response frame sent by the second network device, and the transceiver module 1602 is configured to send the request frame to the second network device, and receive the response frame sent by the second network device.

Alternatively, the processing module 1601 is configured to in a preset time period in a DTI, control to receive a data frame, a control frame, or a management frame sent by the second network device, and control to send a data frame, a control frame, or a management frame to the second network device, and the transceiver module 1602 is configured to receive the data frame, the control frame, or the management frame sent by the second network device, and send the data frame, the control frame, or the management frame to the second network device.

Figure 17:
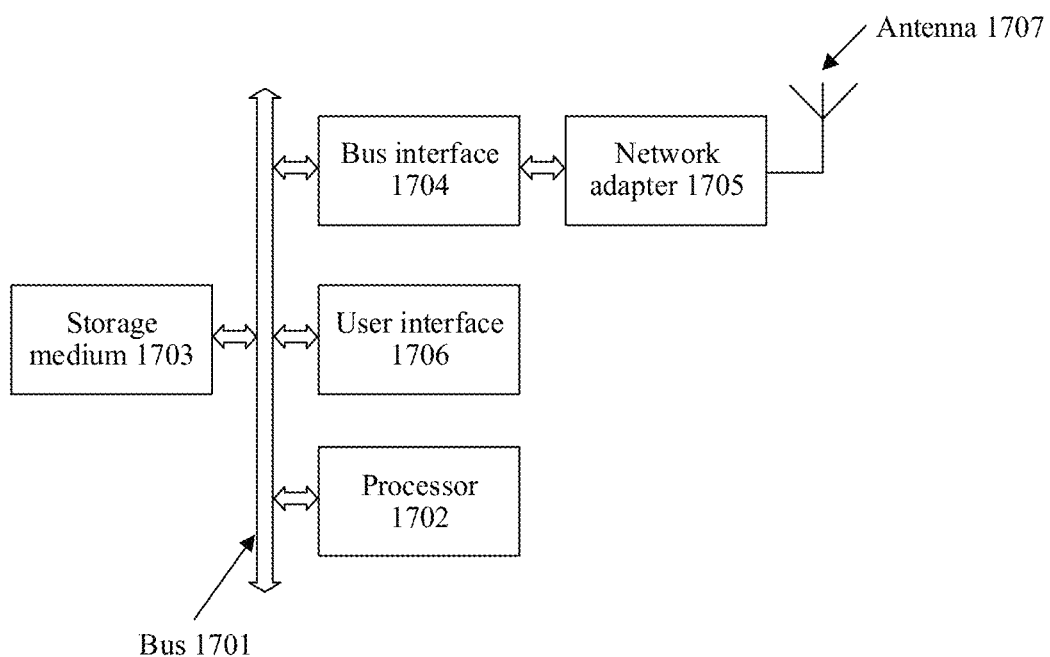
FIG. 17 is a schematic structural diagram 2 of a first network device according to an embodiment of this application.

The following describes a specific product form in FIG. 16 with reference to FIG. 17. FIG. 17 is a schematic structural diagram 2 of a first network device according to an embodiment of this application. The first network device in FIG. 16 may be implemented in a plurality of product forms.

For example, in a possible product form, the first network device may be implemented by using a bus 1701 as a general bus architecture. As shown in FIG. 17, the bus 1701 may include any quantity of interconnect buses and bridges based on a specific application and an overall design constraint of the first network device. The bus 1701 connects various circuits together. These circuits include a processor 1702, a storage medium 1703, a bus interface 1704, and a user interface 1706.

The first network device uses the bus interface 1704 to connect a network adapter 1705 and the like by using the bus 1701. The network adapter 1705 may be configured to implement a signal processing function at a physical layer in a wireless local area network, and send and receive a radio frequency signal by using an antenna 1707. In this application, the antenna 1707 is configured to implement information receiving and sending performed by the first network device in the foregoing method embodiments.

The user interface 1706 may be connected to a user terminal such as a keyboard, a display, a mouse, or a joystick. The bus 1701 may be further connected to various other circuits such as a timing source, a peripheral device, a voltage regulator, and a power management circuit. These circuits are well-known in the art, and therefore are not described in detail.

The processor 1702 is responsible for bus management and general processing (including executing software stored in the storage medium 1703). The processor 1702 may be implemented by using one or more general purpose processors and/or dedicated processors. For example, the processor includes a microprocessor, a microcontroller, a DSP processor, and another circuit that can execute software. The software should be broadly construed as representation of an instruction, data, or any combination thereof, regardless of whether the software is referred to as software, firmware, middleware, microcode, a hardware description language, or the like. In this application, the processor 1702 is configured to implement all processing except information receiving and sending performed by the first network device in the foregoing method embodiments.

In addition, in FIG. 17, the storage medium 1703 is separated from the processor 1702. However, a person skilled in the art easily understands that the storage medium 1703 or any part of the storage medium 1703 may be located outside the first network device. For example, the storage medium 1703 may include a transmission line, a carrier waveform modulated by using data, and/or a computer product separated from a wireless node. These media may be accessed by the processor 1702 by using the bus interface 1704. Alternatively, the storage medium 1703 or any part of the storage medium 1703 may be integrated into the processor 1702. For example, the storage medium 1703 may be a cache and/or a general-purpose register. In this application, the storage medium 1703 is configured to store a computer program, and the computer program is executed by the processor 1702, to implement all processing performed by the processor 1702.

Alternatively, in another possible product form, the first network device may be configured as a general-purpose processing system, for example, collectively referred to as a chip. The general-purpose processing system includes one or more microprocessors providing a processor function, and an external memory providing at least a part of the storage medium 1703. All of these are connected to another support circuit by using an external bus architecture.

Alternatively, in another possible product form, the first network device may be implemented by using the following: an ASIC having the processor 1702, the bus interface 1704, and the user interface 1706, and at least a part of the storage medium 1703 integrated into a single chip.

Alternatively, in another possible product form, the first network device may be implemented by using the following: one or more FPGAs, a PLD, a controller, a state machine, gate logic, a discrete hardware component, any other suitable circuit, or any combination of circuits that can perform various functions described in this application.

It should be understood that the first network device in FIG. 16 and FIG. 17 has any function of the first network device in the foregoing method embodiments. Details are not described herein again.

Optionally, an embodiment of this application further provides a computer readable storage medium. The computer readable storage medium may include an instruction. When the instruction is run on a computer, the computer is enabled to perform the information transmission method performed by the first network device shown in any one of the foregoing embodiments.

Optionally, an embodiment of this application further provides a computer program product including an instruction. When the computer program product is run on a computer, the computer is enabled to perform the information transmission method performed by the first network device shown in any one of the foregoing embodiments.

Functions of the computer program product may be implemented by using hardware or software. When the functions are implemented by using software, the functions may be stored in a computer readable medium or transmitted as one or more instructions or code in the computer readable storage medium.

The first network device, the computer readable storage medium, and the computer program product in the embodiments of this application may perform the information transmission method performed by the first network device shown in any one of the foregoing descriptions. For specific implementation processes and beneficial effects thereof, refer to the foregoing descriptions. Details are not described herein again.

It should be noted that all or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedure or functions according to the embodiments of this application are completely or partially generated. The computer may be a general-purpose computer, a dedicated computer, a computer network, or another programmable apparatus. The computer instructions are stored in a computer readable storage medium, or transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk solid state disk (SSD)), or the like.

What is claimed is:

1. A first network device, comprising:
a transceiver;
a processor; and
a non-transitory storage medium storing a computer program for execution by the processor, the computer program including instructions to:
cause the transceiver to send a first frame, wherein an extended schedule element of the first frame comprises a field indicating communication between network devices is supported, wherein the extended schedule element further comprises a source association identifier and a destination association identifier; and
control the transceiver to transmit information to a second network device when both the first network device and the second network device support communication between network devices, wherein a value of the source association identifier and a value of the destination association identifier are each 0.

2. The first network device according to claim 1, wherein the field indicating the communication between the network devices is supported comprises at least one location in the first frame that is an allocation type field in an allocation control field in an allocation field in the extended schedule element.

3. The first network device according to claim 1, wherein the source association identifier indicates a source network device identifier, and wherein the destination association identifier indicates a target network device identifier.

4. The first network device according to claim 1, wherein the extended schedule element comprises a 1-byte element identifier field, a 1-byte length field, and n allocation fields, each allocation field of the n allocation fields has 15 bytes, and wherein each allocation field of the n allocation fields includes a 2-byte allocation control field, a 2-byte beamforming control field, a 1-byte source association identifier field, a 1-byte destination association identifier field, a 4-byte allocation start field, a 2-byte allocation block duration field, a 1-byte numbers of blocks subfield, and a 2-byte allocation block period field.

5. The first network device according to claim 4, wherein the 2-byte allocation control field comprises a 4-bit allocation identifier field, a 3-bit allocation type field, a 1-bit pseudo-static field, a 1-bit truncatable field, a 1-bit extendable field, a 1-bit personal basic service set active field, a 1-bit low power single carrier used field, a B12 bit and a 3-bit reserved bit.

6. The first network device according to claim 5, wherein the field indicating the communication between the network devices is supported comprises the 3-bit allocation type field and the B12 bit.

7. The first network device according to claim 1, wherein the first frame is sent to the second network device.

8. A method, comprising:
sending, by a first network device, a first frame, wherein an extended schedule element of the first frame comprises a field indicating communication between network devices is supported, and wherein the extended schedule element further comprises a source association identifier and a destination association identifier; and transmitting, by the first network device, information to a second network device when both the first network device and the second network device support communication between network devices, wherein a value of the source association identifier and a value of the destination association identifier are each 0.

9. The method according to claim 8, wherein the field indicating the communication between the network devices is supported comprises at least one location in the first frame that is an allocation type field in an allocation control field in an allocation field in the extended schedule element.

10. The method according to claim 8, wherein the source association identifier indicates a source network device identifier, and wherein the destination association identifier indicates a target network device identifier.

11. The method according to claim 8, wherein the extended schedule element comprises a 1-byte element identifier field, a 1-byte length field, and n allocation fields, wherein each allocation field of the n allocation fields has 15 bytes, wherein each allocation field includes a 2-byte allocation control field, a 2-byte beamforming control field, a 1-byte source association identifier field, a 1-byte destination association identifier field, a 4-byte allocation start field, a 2-byte allocation block duration field, a 1-byte numbers of blocks subfield, and a 2-byte allocation block period field.

12. The method according to claim 11, wherein the 2-byte allocation control field comprises a 4-bit allocation identifier field, a 3-bit allocation type field, a 1-bit pseudo-static field, a 1-bit truncatable field, a 1-bit extendable field, a 1-bit personal basic service set active field, a 1-bit low power single carrier used field, a B12 bit and a 3-bit reserved bit.

13. The method according to claim 12, wherein the field indicating the communication between the network devices is supported comprises the 3-bit allocation type field and the B12 bit.

14. The method according to claim 8, wherein the first frame is sent to the second network device.

15. A device, comprising:
a processor;
wherein the processor is coupled with a non-transitory storage medium storing a computer program for execution by the processor, the computer program including instructions causing the device to:
output a first frame, wherein an extended schedule element of the first frame comprises a field indicating communication between network devices is supported, wherein the extended schedule element further comprises a source association identifier and a destination association identifier; and
exchange information with a second network device when both a first network device and the second network device support communication between network devices, wherein a value of the source association identifier and a value of the destination association identifier are each 0, and wherein the first network device comprises the device.

16. The device according to claim 15, wherein the field indicating the communication between the network devices is supported comprises at least one location in the first frame that is an allocation type field in an allocation control field in an allocation field in the extended schedule element.

17. The device according to claim 15, wherein the source association identifier indicates a source network device identifier, and wherein the destination association identifier indicates a target network device identifier.

18. The device according to claim 15, wherein the extended schedule element comprises a 1-byte element identifier field, a 1-byte length field, and n allocation fields, each allocation field of the n allocation fields has 15 bytes, and wherein each allocation field of the n allocation fields includes a 2-byte allocation control field, a 2-byte beamforming control field, a 1-byte source association identifier field, a 1-byte destination association identifier field, a 4-byte allocation start field, a 2-byte allocation block duration field, a 1-byte numbers of blocks subfield, and a 2-byte allocation block period field.

19. The device according to claim 18, wherein the 2-byte allocation control field comprises a 4-bit allocation identifier field, a 3-bit allocation type field, a 1-bit pseudo-static field, a 1-bit truncatable field, a 1-bit extendable field, a 1-bit personal basic service set active field, a 1-bit low power single carrier used field, a B12 bit and a 3-bit reserved bit.

20. The device according to claim 19, wherein the field indicating the communication between the network devices is supported comprises the 3-bit allocation type field and the B12 bit.

* * * * *

UNITED STATES PATENT AND TRADEMARK OFFICE
CERTIFICATE OF CORRECTION

PATENT NO. : 12,244,525 B2  Page 1 of 1
APPLICATION NO. : 18/527690
DATED : March 4, 2025
INVENTOR(S) : Han et al.

It is certified that error appears in the above-identified patent and that said Letters Patent is hereby corrected as shown below:

In the Specification

In Column 23, Line 67, delete "A-BF" and insert -- A-BFT --.

In Column 24, Line 51, delete "A-BF" and insert -- A-BFT --.

In Column 53, Line 47, delete "A-BF" and insert -- A-BFT --.

Signed and Sealed this
Fifteenth Day of April, 2025

Coke Morgan Stewart
*Acting Director of the United States Patent and Trademark Office*